(12) United States Patent
Kim et al.

(10) Patent No.: US 11,150,837 B2
(45) Date of Patent: Oct. 19, 2021

(54) METHOD, DEVICE AND SYSTEM FOR PROCESSING SEQUENTIAL GROUPS OF BUFFERED WRITE DATA

(71) Applicant: Samsung Electronics Co., Ltd., Suwon-si (KR)

(72) Inventors: Bo-Keong Kim, Seoul (KR); Ju-Young Lee, Seoul (KR); Seok-Pal Jung, Seongnam-si (KR); Sung-Hyun Cho, Hwaseong-si (KR); Seung-Eun Choi, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/529,197

(22) Filed: Aug. 1, 2019

(65) Prior Publication Data
US 2020/0201570 A1 Jun. 25, 2020

(30) Foreign Application Priority Data
Dec. 20, 2018 (KR) .................. 10-2018-0165962

(51) Int. Cl.
*G06F 12/00* (2006.01)
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0656* (2013.01); *G06F 3/0679* (2013.01); *G06F 12/10* (2013.01); *G06F 2212/7201* (2013.01)

(58) Field of Classification Search
CPC ...... G06F 3/0659; G06F 3/0604; G06F 12/10; G06F 3/0656; G06F 3/0679; G06F 2212/7201
See application file for complete search history.

(56) References Cited

U.S. PATENT DOCUMENTS

| 6,125,407 | A  | 9/2000  | Abily et al. |
| 6,553,430 | B1 | 4/2003  | Keller |
| 7,457,921 | B2 | 11/2008 | Gabryjelski et al. |
| 7,679,133 | B2 | 3/2010  | Son et al. |
| 7,844,802 | B2 | 11/2010 | McKenney |
| 8,006,047 | B2 | 8/2011  | De Souza et al. |
| 8,205,033 | B2 | 6/2012  | Saeki et al. |

(Continued)

*Primary Examiner* — Arvind Talukdar
(74) *Attorney, Agent, or Firm* — Harness, Dickey & Pierce, P.L.C.

(57) ABSTRACT

A method of writing data in a storage device including sequentially receiving a plurality of data write commands, sequentially assigning a plurality of write data corresponding to the plurality of data write commands to a plurality of buffer groups by determining continuity of logical addresses of the plurality of write data such that each of the plurality of buffer groups temporarily stores some of the plurality of write data included in a respective single stream and having consecutive logical addresses, assigning a plurality of serial numbers to the plurality of write data, respectively, based on an order in which the plurality of write data are assigned to the plurality of buffer groups, programming the plurality of write data temporarily stored in the plurality of buffer groups into a plurality of memory blocks, and updating a logical-to-physical mapping table based on the plurality of serial numbers may be provided.

20 Claims, 19 Drawing Sheets

(56) References Cited

U.S. PATENT DOCUMENTS

| | | | |
|---|---|---|---|
| 8,553,466 B2 | 10/2013 | Han et al. | |
| 8,559,235 B2 | 10/2013 | Yoon et al. | |
| 8,654,587 B2 | 2/2014 | Yoon et al. | |
| 2009/0276586 A1* | 11/2009 | Royer | G06F 12/0246 711/154 |
| 2010/0169542 A1* | 7/2010 | Sinclair | G06F 12/0246 711/103 |
| 2010/0205367 A1 | 8/2010 | Ehrlich et al. | |
| 2011/0099323 A1* | 4/2011 | Syu | G06F 12/0246 711/103 |
| 2011/0233648 A1 | 9/2011 | Seol et al. | |
| 2012/0124276 A1* | 5/2012 | Ahn | G06F 12/0246 711/103 |
| 2013/0166825 A1* | 6/2013 | Kim | G06F 12/0246 711/103 |
| 2013/0191601 A1* | 7/2013 | Peterson | G06F 12/0868 711/137 |
| 2014/0082265 A1* | 3/2014 | Cheng | G06F 12/0246 711/103 |
| 2014/0310483 A1* | 10/2014 | Bennett | G06F 3/0619 711/154 |
| 2014/0331001 A1 | 11/2014 | Liu et al. | |
| 2015/0117100 A1* | 4/2015 | Park | G11C 16/10 365/185.03 |
| 2017/0139839 A1* | 5/2017 | Ke | G06F 3/0679 |
| 2017/0228188 A1* | 8/2017 | Hassani | G06F 3/06 |

\* cited by examiner

| BG1 | DA | DB | DC | DD | | | | |
|---|---|---|---|---|---|---|---|---|
| | 100 | 101 | 102 | 103 | | | | |
| | 1 | 2 | 3 | 4 | | | | |

FIG. 8B

| BG1 | DA | DB | DC | DD | DE | | | |
|---|---|---|---|---|---|---|---|---|
| | 100 | 101 | 102 | 103 | 104 | | | |
| | 1 | 2 | 3 | 4 | 5 | | | |

FIG. 8C

| BG1 | DA | DB | DC | DD | DE | | | |
|---|---|---|---|---|---|---|---|---|
| | 100 | 101 | 102 | 103 | 104 | | | |
| | 1 | 2 | 3 | 4 | 5 | | | |

| BG2 | D1 | D2 | D3 | D4 | D5 | D6 | D7 | D8 |
|---|---|---|---|---|---|---|---|---|
| | 500 | 501 | 502 | 503 | 504 | 505 | 506 | 507 |
| | 6 | 7 | 8 | 9 | 10 | 11 | 12 | 13 |

| BG3 | D9 | | | | | | | |
|---|---|---|---|---|---|---|---|---|
| | 508 | | | | | | | |
| | 14 | | | | | | | |

FIG. 8D

| BG1 | DA  | DB  | DC  | DD  | DE  |     |     |     |
|-----|-----|-----|-----|-----|-----|-----|-----|-----|
|     | 100 | 101 | 102 | 103 | 104 |     |     |     |
|     | 1   | 2   | 3   | 4   | 5   |     |     |     |

| BG2 | D1  | D2  | D3  | D4  | D5  | D6  | D7  | D8  |
|-----|-----|-----|-----|-----|-----|-----|-----|-----|
|     | 500 | 501 | 502 | 503 | 504 | 505 | 506 | 507 |
|     | 6   | 7   | 8   | 9   | 10  | 11  | 12  | 13  |

| BG3 | D9  | D10 | D11 | D12 | D13 | D14 | D15 | D16 |
|-----|-----|-----|-----|-----|-----|-----|-----|-----|
|     | 508 | 509 | 510 | 511 | 512 | 513 | 514 | 515 |
|     | 14  | 15  | 16  | 17  | 18  | 19  | 20  | 21  |

| BG4 | D17 | D18 | D19 | D20 | D21 | D22 | D23 | D24 |
|-----|-----|-----|-----|-----|-----|-----|-----|-----|
|     | 516 | 517 | 518 | 519 | 520 | 521 | 522 | 523 |
|     | 22  | 23  | 24  | 25  | 26  | 27  | 28  | 29  |

FIG. 8E

| BG1 | DA  | DB  | DC  | DD  | DE  | DF  | DG  | DH  |
|-----|-----|-----|-----|-----|-----|-----|-----|-----|
|     | 100 | 101 | 102 | 103 | 104 | 105 | 106 | 107 |
|     | 1   | 2   | 3   | 4   | 5   | 30  | 31  | 32  |

| BG2 | D1  | D2  | D3  | D4  | D5  | D6  | D7  | D8  |
|-----|-----|-----|-----|-----|-----|-----|-----|-----|
|     | 500 | 501 | 502 | 503 | 504 | 505 | 506 | 507 |
|     | 6   | 7   | 8   | 9   | 10  | 11  | 12  | 13  |

| BG3 | D9  | D10 | D11 | D12 | D13 | D14 | D15 | D16 |
|-----|-----|-----|-----|-----|-----|-----|-----|-----|
|     | 508 | 509 | 510 | 511 | 512 | 513 | 514 | 515 |
|     | 14  | 15  | 16  | 17  | 18  | 19  | 20  | 21  |

| BG4 | D17 | D18 | D19 | D20 | D21 | D22 | D23 | D24 |
|-----|-----|-----|-----|-----|-----|-----|-----|-----|
|     | 516 | 517 | 518 | 519 | 520 | 521 | 522 | 523 |
|     | 22  | 23  | 24  | 25  | 26  | 27  | 28  | 29  |

| BG5 | DI  | DJ  |     |     |     |     |     |     |
|-----|-----|-----|-----|-----|-----|-----|-----|-----|
|     | 108 | 109 |     |     |     |     |     |     |
|     | 33  | 34  |     |     |     |     |     |     |

FIG. 8F

| BG1 | DA 100 1 | DB 101 2 | DC 102 3 | DD 103 4 | DE 104 5 | DF 105 30 | DG 106 31 | DH 107 32 |
|---|---|---|---|---|---|---|---|---|
| BG2 | D1 500 6 | D2 501 7 | D3 502 8 | D4 503 9 | D5 504 10 | D6 505 11 | D7 506 12 | D8 507 13 |
| BG3 | D9 508 14 | D10 509 15 | D11 510 16 | D12 511 17 | D13 512 18 | D14 513 19 | D15 514 20 | D16 515 21 |
| BG4 | D17 516 22 | D18 517 23 | D19 518 24 | D20 519 25 | D21 520 26 | D22 521 27 | D23 522 28 | D24 523 29 |
| BG5 | DI 108 33 | DJ 109 34 | | | | | | |
| BG6 | D25 524 35 | D26 525 36 | D27 526 37 | D28 527 38 | D29 528 39 | D30 529 40 | D31 530 41 | D32 531 42 |
| BG7 | D33 532 43 | | | | | | | |

FIG. 8G

| BG1 | DA 100 1 | DB 101 2 | DC 102 3 | DD 103 4 | DE 104 5 | DF 105 30 | DG 106 31 | DH 107 32 |
|---|---|---|---|---|---|---|---|---|
| BG2 | D1 500 6 | D2 501 7 | D3 502 8 | D4 503 9 | D5 504 10 | D6 505 11 | D7 506 12 | D8 507 13 |
| BG3 | D9 508 14 | D10 509 15 | D11 510 16 | D12 511 17 | D13 512 18 | D14 513 19 | D15 514 20 | D16 515 21 |
| BG4 | D17 516 22 | D18 517 23 | D19 518 24 | D20 519 25 | D21 520 26 | D22 521 27 | D23 522 28 | D24 523 29 |
| BG5 | DI 108 33 | DJ 109 34 | DK 110 44 | DL 111 45 | DM 112 46 | DN 113 47 | DO 114 48 | DP 115 49 |
| BG6 | D25 524 35 | D26 525 36 | D27 526 37 | D28 527 38 | D29 528 39 | D30 529 40 | D31 530 41 | D32 531 42 |
| BG7 | D33 532 43 | | | | | | | |

FIG. 8H

| BG1 | DA 100 1 | DB 101 2 | DC 102 3 | DD 103 4 | DE 104 5 | DF 105 30 | DG 106 31 | DH 107 32 |
|---|---|---|---|---|---|---|---|---|
| BG2 | D1 500 6 | D2 501 7 | D3 502 8 | D4 503 9 | D5 504 10 | D6 505 11 | D7 506 12 | D8 507 13 |
| BG3 | D9 508 14 | D10 509 15 | D11 510 16 | D12 511 17 | D13 512 18 | D14 513 19 | D15 514 20 | D16 515 21 |
| BG4 | D17 516 22 | D18 517 23 | D19 518 24 | D20 519 25 | D21 520 26 | D22 521 27 | D23 522 28 | D24 523 29 |
| BG5 | DI 108 33 | DJ 109 34 | DK 110 44 | DL 111 45 | DM 112 46 | DN 113 47 | DO 114 48 | DP 115 49 |
| BG6 | D25 524 35 | D26 525 36 | D27 526 37 | D28 527 38 | D29 528 39 | D30 529 40 | D31 530 41 | D32 531 42 |
| BG7 | D33 532 43 | | | | | | | |
| BG8 | DQ 116 50 | | | | | | | |

FIG. 11

| BG2 | D1 500 6 | D2 501 7 | D3 502 8 | D4 503 9 | D5 504 10 | D6 505 11 | D7 506 12 | D8 507 13 |
|---|---|---|---|---|---|---|---|---|
| BG3 | D9 508 14 | D10 509 15 | D11 510 16 | D12 511 17 | D13 512 18 | D14 513 19 | D15 514 20 | D16 515 21 |
| BG4 | D17 516 22 | D18 517 23 | D19 518 24 | D20 519 25 | D21 520 26 | D22 521 27 | D23 522 28 | D24 523 29 |
| BG1 | DA 100 1 | DB 101 2 | DC 102 3 | DD 103 4 | DE 104 5 | DF 105 30 | DG 106 31 | DH 107 32 |
| BG6 | D25 524 35 | D26 525 36 | D27 526 37 | D28 527 38 | D29 528 39 | D30 529 40 | D31 530 41 | D32 531 42 |
| BG5 | DI 108 33 | DJ 109 34 | DK 110 44 | DL 111 45 | DM 112 46 | DN 113 47 | DO 114 48 | DP 115 49 |

PROGRAM ORDER

FIG. 15

| BG2 | D1 500 6 | D2 501 7 | D3 502 8 | D4 503 9 | D5 504 10 | D6 505 11 | D7 506 12 | D8 507 13 |
|---|---|---|---|---|---|---|---|---|
| BG3 | D9 508 14 | D10 509 15 | D11 510 16 | D12 511 17 | D13 512 18 | D14 513 19 | D15 514 20 | D16 515 21 |
| BG4 | D17 516 22 | D18 517 23 | D19 518 24 | D20 519 25 | D21 520 26 | D22 521 27 | D23 522 28 | D24 523 29 |
| BG1 | DA 100 1 | DB 101 2 | DC 102 3 | DD 103 4 | DE 104 5 | DF 105 30 | DG 106 31 | DH 107 32 |
| BG6 | D25 524 35 | D26 525 36 | D27 526 37 | D28 527 38 | D29 528 39 | D30 529 40 | D31 530 41 | D32 531 42 |
| BG5 | DI 108 33 | DJ 109 34 | DK 110 44 | DL 111 45 | DM 112 46 | DN 113 47 | DO 114 48 | DP 115 49 |

PROGRAM ORDER

METHOD, DEVICE AND SYSTEM FOR PROCESSING SEQUENTIAL GROUPS OF BUFFERED WRITE DATA

CROSS-REFERENCE TO RELATED APPLICATION

This application claims priority under 35 USC § 119 to Korean Patent Application No. 10-2018-0165962, filed on Dec. 20, 2018 in the Korean Intellectual Property Office (KIPO), the contents of which are herein incorporated by reference in their entirety.

BACKGROUND

1. Technical Field

Example embodiments relate to semiconductor integrated circuits, and more particularly to methods of writing data in storage devices, storage devices performing the methods, and/or storage systems including the storage devices.

2. Description of the Related Art

A storage system includes a host device and a storage device. In the storage system, the host device and the storage device are connected to each other via various interface standards, such as universal flash storage (UFS), serial advanced technology attachment (SATA), small computer system interface (SCSI), serial attached SCSI (SAS), embedded multi-media card (eMMC), etc. The storage device may be a memory system including a memory controller and a memory device or including only a memory device. These types of storage devices usually include both nonvolatile and volatile memories. In the storage device, a nonvolatile memory is typically used as a primary data storage medium, while a volatile memory is used as a data input and/or output (I/O) buffer memory (or "cache") between the nonvolatile memory and a controller or interface.

SUMMARY

At least one example embodiment of the present disclosure provides a method of efficiently writing data in a storage device while ensuring a write order requested by a host.

At least one example embodiment of the present disclosure provides a storage device capable of efficiently writing data while ensuring a write order requested by a host.

At least one example embodiment of the present disclosure provides a storage system including the storage device.

According to an example embodiment of the inventive concepts, a method of writing data in a storage device includes sequentially receiving a plurality of data write commands, sequentially assigning a plurality of write data corresponding to the plurality of data write commands to a plurality of buffer groups by determining continuity of logical addresses of the plurality of write data such that each of the plurality of buffer groups temporarily stores some of the plurality of write data included in a respective single stream and having consecutive logical addresses, assigning a plurality of serial numbers to the plurality of write data, respectively, based on an order in which the plurality of write data are assigned to the plurality of buffer groups, programming the plurality of write data temporarily stored in the plurality of buffer groups into a plurality of memory blocks, and updating a logical-to-physical mapping table based on the plurality of serial numbers.

According to an example embodiment of the inventive concepts, a storage device includes a plurality of nonvolatile memories including a plurality of memory blocks, at least one buffer memory including a plurality of buffer groups, and a storage controller. The storage controller may be configured to sequentially receive a plurality of data write commands, sequentially assign a plurality of write data corresponding to the plurality of data write commands to the plurality of buffer groups by determining continuity of logical addresses of the plurality of write data, assign a plurality of serial numbers to the plurality of write data based on an order in which the plurality of write data are assigned to the plurality of buffer groups such that each of the plurality of buffer groups temporarily stores some of the plurality of write data included in a respective single stream and having consecutive logical addresses, program the plurality of write data temporarily stored in the plurality of buffer groups into the plurality of memory blocks, and update a logical-to-physical mapping table based on the plurality of serial numbers.

According to an example embodiment of the inventive concepts, a storage system includes a host configured to sequentially provide a plurality of data write commands and a plurality of write data corresponding to the plurality of data write command, and a storage device controlled by the host and configured to store the plurality of write data. The storage device may include a plurality of nonvolatile memories including a plurality of memory blocks, at least one buffer memory including a plurality of buffer groups, and a storage controller. The storage controller may be configured to sequentially receive the plurality of data write commands, sequentially assign the plurality of write data to the plurality of buffer groups by determining continuity of logical addresses of the plurality of write data, assign a plurality of serial numbers to the plurality of write data based on an order in which the plurality of write data are assigned to the plurality of buffer groups such that each of the plurality of buffer groups temporarily stores some of the plurality of write data included in a respective single stream and having consecutive logical addresses, program the plurality of write data temporarily stored in the plurality of buffer groups into the plurality of memory blocks, and update a logical-to-physical mapping table based on the plurality of serial numbers.

In methods of writing data in the storage device, storage devices and storage systems according to some example embodiments, the flush command and/or the barrier command that are provided by the host to ensure the data write order from the host may be replaced or omitted by assigning serial numbers at a time of buffer assigning operation and by updating a mapping table based on the assigned serial numbers. In other words, the data write order from the host may be ensured or guaranteed even if there is no direct control from the host (e.g., independently of a control of the host, and without in-order flushing). Accordingly, the command execution time may be reduced, no barrier option of a file system may be supported, and the number of flushing may be reduced, thereby improving or enhancing performance of the storage device. Further, even if the power supplied to the storage device is suddenly off, the data write order from the host may be ensured or guaranteed by performing a scan operation using the serial numbers stored together with the write data.

BRIEF DESCRIPTION OF THE DRAWINGS

Illustrative, non-limiting example embodiments will be more clearly understood from the following detailed description taken in conjunction with the accompanying drawings.

FIGS. 7, 8A, 8B, 8C, 8D, 8E, 8F, 8G and 8H are diagrams for describing a method of writing data in a storage device according to an example embodiment.

FIG. 11 is a diagram for describing a method of writing data in a storage device according to an example embodiment.

FIG. 15 is a diagram for describing a method of writing data in a storage device according to an example embodiment.

DETAILED DESCRIPTION

Figure 1:
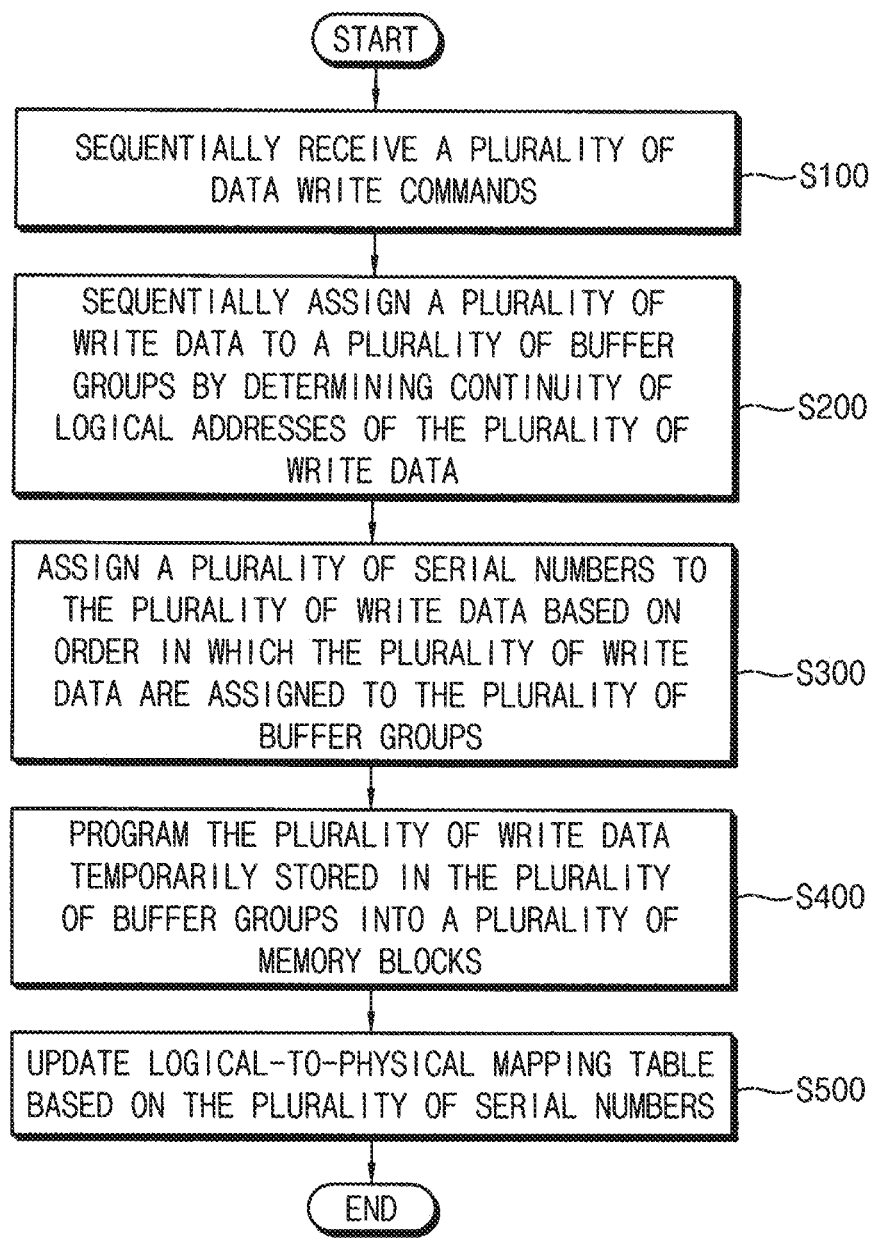
FIG. 1 is a flowchart illustrating a method of writing data in a storage device according to an example embodiment.

Various example embodiments will be described more fully with reference to the accompanying drawings, in which some example embodiments are shown. The present disclosure may, however, be embodied in many different forms and should not be construed as limited to the example embodiments set forth herein. Like reference numerals refer to like elements throughout this application.

As used herein, the term "and/or" includes any and all combinations of one or more of the associated listed items. Expressions such as "at least one of," when preceding a list of elements, modify the entire list of elements and do not modify the individual elements of the list. Thus, for example, both "at least one of A, B, or C" and "A, B, and/or C" means either A, B, C or any combination thereof.

While the term "same" or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

FIG. 1 is a flowchart illustrating a method of writing data in a storage device according to an example embodiment.

Referring to FIG. 1, a storage device according to an example embodiment includes a plurality of buffer groups and a plurality of memory blocks. The plurality of memory blocks may be used as a primary storage medium for storing data, and may be included in nonvolatile memories. The plurality of buffer groups may be used as a cache for writing and/or reading data, and may be included in at least one volatile memory. Configurations of the storage device and a storage system including the storage device will be described with reference to FIG. 2.

The storage device according to some example embodiments may operate based on a multi-stream scheme, in which a plurality of data written into the plurality of memory blocks are classified into and managed by a plurality of streams such that the storage device writes data associated with the same stream into the same single memory block. In the multi-stream scheme, one memory block included in the storage device may only store data with the same stream. However, example embodiments are not limited thereto, and one memory block may store data with different streams according to some example embodiments, which will be described later.

In a method of writing data in the storage device according to an example embodiment, a plurality of data write commands are sequentially received (operation S100). For example, the plurality of data write commands may be sequentially provided from an external host (e.g., host 200 in FIG. 2). While performing a data write operation, ensuring a data write order (or ordering) from the host is desired.

Further, a plurality of write data corresponding to the plurality of data write commands are assigned or allocated to the plurality of buffer groups by determining continuity of logical addresses of the plurality of write data (operation S200). The plurality of write data are assigned to the plurality of buffer groups such that each of the plurality of buffer groups temporarily stores some of the plurality of write data included in a respective single stream and having consecutive logical addresses. In other words, the plurality of write data may be temporarily stored into the plurality of buffer groups by the buffer assigning operation in operation S200. For example, the logical address may include a logical page number (LPN). The buffer assigning operation in operation S200 will be described with reference to FIGS. 3, 4, 5 and the like.

When the number of streams provided by the storage device is greater than or equal to the number of streams from the host (e.g., when the buffer groups are sufficiently provided or when the resource of the buffer groups is sufficient), one buffer group may be filled by data with only one stream. In this case, when a program operation is performed, one memory block of the storage device may always store the data with the same stream. However, when the number of streams provided by the storage device is less than the number of streams from the host, and if a new buffer group is assigned whenever data with a new stream is received, each buffer group may be just occupied, data stored in each buffer group may not be programmed, and thus a situation in which a new buffer group cannot be assigned may happen. If a new buffer group cannot be assigned due to the resource constraints of the buffer groups as described above, the oldest or earliest assigned buffer group may be reassigned. In this case, one buffer group (e.g., the reassigned buffer group) may store data with different streams, and thus one memory block of the storage device may store the data with the different streams when a program operation is performed.

A plurality of serial numbers are assigned or given to the plurality of write data, respectively, based on an order (or sequence) in which the plurality of write data are assigned to the plurality of buffer groups (operation S300). For example, the serial number may be assigned to each page buffer group in accordance with the buffer assigning order. Operations S200 and S300 may be substantially simultaneously or concurrently performed. The serial number assigning operation in operation S300 will be described with reference to FIG. 6 and the like.

After the plurality of data write commands are received, the plurality of write data and a plurality of logical addresses corresponding to the plurality of data write commands may be received. As described above, the buffer assigning operation and the serial number assigning operation may be performed to ensure the data write order from the host. For example, the plurality of serial numbers assigned in operation S300 may indicate the data write order provided from the host.

The plurality of write data temporarily stored in the plurality of buffer groups are programmed into a plurality of memory blocks (operation S400). For example, the plurality of write data may be programmed based on the multi-stream scheme, and data temporarily stored in a buffer group which is full (e.g., is entirely filled) first may be performed first. The plurality of serial numbers assigned in operation S300 may be stored together with the plurality of write data. Thus, when a power supplied to the storage device is, for example, suddenly off as will be described with reference to operation S600 in FIG. 14, a scan operation may be performed using the serial numbers to maintain the consistency of data, and thus can ensure the data write order from the host. The program operation in operation S400 will be described with reference to FIGS. 9, 10 and the like.

A logical-to-physical mapping table is updated based on the plurality of serial numbers (operation S500). As described above, the plurality of serial numbers may indicate the data write order provided from the host. Thus, when the logical-to-physical mapping table is updated based on the plurality of serial numbers, the data write order from the host may be ensured regardless of a program order in operation S400. The update operation in operation S500 will be described with reference to FIG. 12 and the like.

In a storage system including a host and a storage device, an order of writing data from the host (e.g., a host-in order) and an order of flushing a buffer (e.g., a cache) in the storage device do not match or are different from each other to improve performance of the storage system (e.g., data write performance). In such system, a flush command and/or a barrier command have been used to ensure or guarantee the data write order from the host. The flush command indicates a command to immediately write data temporarily stored in the cache included in the storage device into the memory block, and the barrier command indicates a command to not change an order of write commands prior to the barrier command and an order of write commands subsequent to the barrier command. When the flush command and/or the barrier command are used, the data write order from the host is ensured, but there is a problem that a command execution time (e.g., a time required for writing data) increases.

In the method of writing data in the storage device according to an example embodiment, the flush command and/or the barrier command provided by the host to ensure the data write order from the host may be replaced or omitted by assigning the serial numbers at the time of buffer assigning operation and by updating the mapping table based on the assigned serial numbers. In other words, the data write order from the host may be ensured or guaranteed even if there is no direct control from the host (e.g., independently of a control of the host, and without in-order flushing). Accordingly, the command execution time may be reduced, no barrier option of a file system may be supported, and the number of flushing may be reduced, thereby improving or enhancing performance of the storage device.

Figure 2:
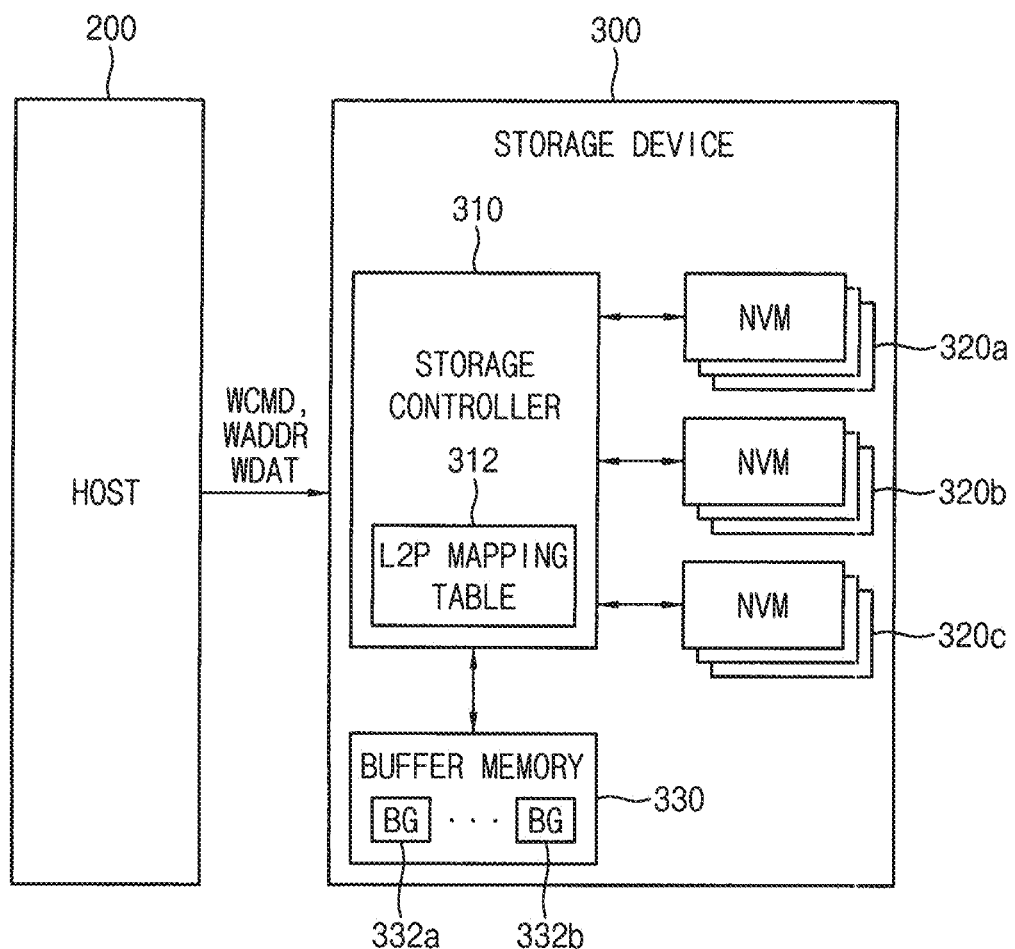
FIG. 2 is a block diagram illustrating a storage device and a storage system including the storage device according to an example embodiment.

FIG. 2 is a block diagram illustrating a storage device and a storage system including the storage device according to an example embodiment.

Referring to FIG. 2, a storage system 150 includes a host 200 and a storage device 300.

The host 200 controls overall operations of the storage system 150. For example, although not illustrated in FIG. 2, the host 200 may include a host processor and a host memory. The host processor may control an operation of the host 200. For example, the host processor may execute an operating system (OS). The host memory may store instructions and/or data that are executed and/or processed by the host processor.

The host 200 provides a plurality of data write commands WCMD, a plurality of write addresses WADDR corresponding to the plurality of data write commands WCMD and a plurality of write data WDAT corresponding to the plurality of data write commands WCMD to the storage device 300. The plurality of write addresses WADDR may be logical addresses. For example, although not illustrated in FIG. 2, the operating system executed by the host processor may include a file system for file management, a block layer for performing data read/write operations by units of a memory block, and a device driver for controlling peripheral devices including the storage device 300 at the operating system level. The plurality of data write commands WCMD, the plurality of write addresses WADDR and the plurality of write data WDAT may be generated by a file storing request by an application or an application program executed by the host processor and/or a program request by the file system.

The storage device 300 is accessed by the host 200, operates in the multi-stream scheme, and ensures or guarantees a data write order from the host 200 independently of a control of the host 200. The storage device 300 may include a storage controller 310, a plurality of nonvolatile memories 320a, 320b and 320c, and a buffer memory 330.

The storage controller 310 may control an operation of the storage device 300, e.g., a data write operation, based on a command, an address, and data that are received from the host 200.

The storage controller 310 may include a logical-to-physical (L2P) mapping table 312. The logical-to-physical mapping table 312 may include one-to-one correspondences between the logical addresses and physical addresses of data stored in the storage device 300. For example, as will be described with reference to FIGS. 13A, 13B and 13C, the logical-to-physical mapping table 312 may include a meta log tree and a delayed mate log. For example, a meta log may indicate individual logical-to-physical mapping information, and thus the meta log tree may include information of logical addresses provided from the host 200, physical addresses corresponding to the logical addresses, and serial numbers assigned.

The storage controller 310 may operate based on the method described with reference to FIG. 1. For example, the storage controller 310 may sequentially receive the plurality of data write commands WCMD, perform the buffer assigning operation by determining continuity of logical addresses (e.g., the plurality of write addresses WADDR) of the plurality of write data WDAT, perform the serial number assigning operation, performs the program operation on the plurality of write data WDAT based on the multi-stream scheme, and update the logical-to-physical mapping table 312 based on the plurality of serial numbers. In other words, the storage controller 310 may control the storage device 300 to operate in the multi-stream scheme and to ensure the data write order from the host 200 independently of the control of the host 200.

The plurality of nonvolatile memories 320a, 320b and 320c may store the plurality of data separately for each stream. For example, the plurality of nonvolatile memories 320a, 320b and 320c may store the plurality of write data WDAT. As will be described with reference to FIG. 16, each of the plurality of nonvolatile memories 320a, 320b and 320c may include a plurality of memory blocks.

In some example embodiments, each of the plurality of nonvolatile memories 320a, 320b and 320c may include a NAND flash memory. In other example embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM).

The buffer memory 330 may store instructions and/or data that are executed and/or processed by the storage controller 310, and may temporarily store data stored in or to be stored into the plurality of nonvolatile memories 320a, 320b and 320c. For example, the buffer memory 330 may include at least one of various volatile memories (e.g., a dynamic random access memory (DRAM), or a static random access memory (SRAM)).

The buffer memory 330 may include a plurality of buffer groups (BG) 332a and 332b. For example, one buffer group may represent a unit of the buffer assigning operation described above, and one or more buffer groups may represent a unit of the program operation.

In some example embodiments, the storage device 300 may be or include at least one of an embedded multi-media card (eMMC) or a universal flash storage (UFS). In other example embodiments, the storage device 300 may be or include one of a solid state drive (SSD), a multi media card (MMC), a secure digital (SD) card, a micro SD card, a memory stick, a chip card, a universal serial bus (USB) card, a smart card, or a compact flash (CF) card.

In some example embodiments, the storage device 300 may be connected to the host 200 through a block accessible interface which may include, for example, a UFS, an eMMC, a serial advanced technology attachment (SATA) bus, a nonvolatile memory express (NVMe) bus, or a serial attached SCSI (SAS) bus. The storage device 300 may use a block accessible address space corresponding to an access size of the plurality of nonvolatile memories 320a, 320b and 320c to provide the block accessible interface to the host 200, for allowing the access by units of a memory block with respect to data stored in the plurality of nonvolatile memories 320a, 320b and 320c.

In some example embodiments, the storage system 150 may be or include any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, or a robotic device. In other example embodiments, the storage system 150 may be any computing system, such as a personal computer (PC), a server computer, a workstation, a digital television, a set-top box, or a navigation system.

Figure 3:
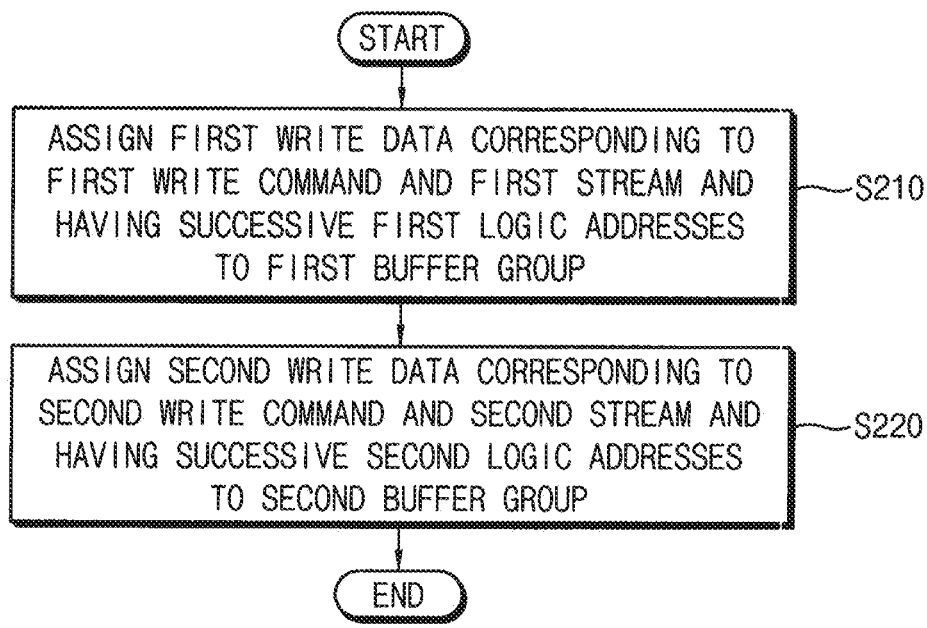
FIG. 3 is a flowchart illustrating an example of sequentially assigning a plurality of write data to a plurality of buffer groups in FIG. 1.
Figure 4:
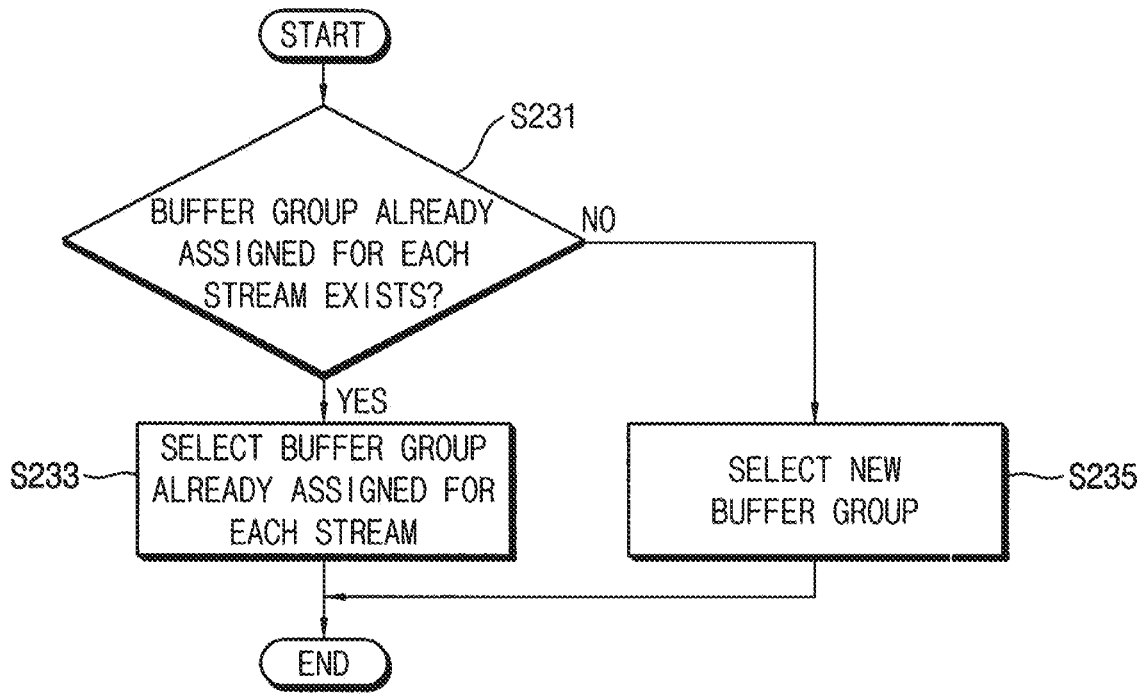
FIGS. 4 and 5 are flowcharts illustrating detailed examples of a buffer assigning operation of FIG. 3.
Figure 5:
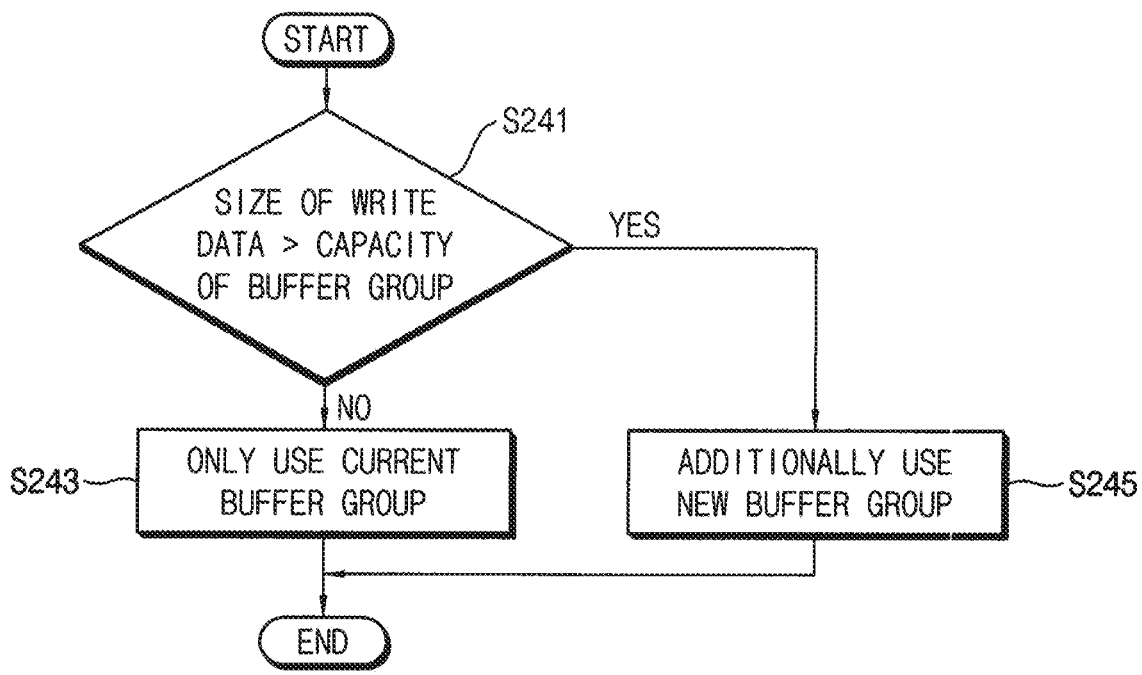

FIG. 3 is a flowchart illustrating an example of sequentially assigning a plurality of write data to a plurality of buffer groups in FIG. 1. FIGS. 4 and 5 are flowcharts illustrating detailed examples of a buffer assigning operation of FIG. 3.

Referring to FIGS. 1 and 3, when sequentially assigning the plurality of write data to the plurality of buffer groups (operation S200), first write data may be assigned to a first buffer group (operation S210). The first write data may correspond to a first write command and a first stream, and may have first logical addresses which are successive addresses. Second write data may be assigned to a second buffer group (operation S220). The second write data may correspond to a second write command and a second stream, and may have second logical addresses which are successive addresses. The second write command may be subsequent to the first write command, and may be received after the first write command is received. The second stream may be different from the first stream. The second buffer group may be different from the first buffer group.

To store the plurality of write data in the plurality of memory blocks based on the multi-stream scheme, the plurality of buffer groups may also be controlled based on the multi-stream scheme according to some example embodiments. In other words, a multi-stream buffer operating scheme may be implemented. For example, as described with reference to FIG. 1, in a normal condition where the resource of the buffer groups is sufficient, data with one stream may be assigned to and temporarily stored in one buffer group, and data with different streams may be assigned to different buffer groups. However, in a condition where the buffer groups have resource constraints, data with different streams may be assigned to and temporarily stored in one buffer group.

Further, to ensure the data write order from the host independently of the control of the host, the multi-stream buffer operating scheme may be implemented by determining the continuity of the logical addresses, without or rather than receiving a stream identifier (ID) from the host, according to some example embodiments. For example, as will be described with reference to FIG. 7, logical addresses of write data in the same stream may be consecutive, and logical addresses of write data in different streams may be non-consecutive. Thus, write data having consecutive logical addresses may be determined as the same stream, and may be assigned to the same buffer group.

Referring to FIGS. 1, 3 and 4, when assigning the first write data corresponding to the first stream to the first buffer group (operation S210), or when assigning the second write data corresponding to the second stream to the second buffer group (operation S220), it may be determined or judged whether a buffer group already assigned for each stream exists or not (operation S231), and a buffer group may be selected based on a result of the determination.

When it is determined that the buffer group already assigned for each stream exists (operation S231: YES), the buffer group already assigned for each stream may be selected (operation S233), and write data may be temporarily stored in the selected buffer group. For example, when the first write data are to be temporarily stored, and when there is a buffer group in which other write data corresponding to the first stream are already stored temporarily, the corresponding buffer group may be selected as the first buffer group, and the first write data may be assigned to and temporarily stored in the first buffer group.

When it is determined that the buffer group already assigned for each stream does not exist (operation S231: NO), a new buffer group (e.g., a free or unused buffer group) may be selected (operation S235), and write data may be temporarily stored in the selected buffer group. For example, when the second write data are to be temporarily stored, and when write data corresponding to the second stream is temporarily stored for the first time, one free buffer group among the plurality of buffer groups may be selected as the second buffer group, and the second write data may be assigned to and temporarily stored in the second buffer group.

Referring to FIGS. 1, 3 and 5, when assigning the first write data corresponding to the first stream to the first buffer group (operation S210), or when assigning the second write data corresponding to the second stream to the second buffer group (operation S220), a size of write data to be temporarily stored may be compared with a capacity of the selected buffer group or a current buffer group (operation S241), and whether to use only the current buffer group or to use a new buffer group in addition to the current buffer group may be determined based on a result of the comparison.

When the size of write data to be temporarily stored is less than or equal to the capacity of the current buffer group (operation S241: NO), write data may be temporarily stored using only the current buffer group (operation S243). For example, when the first write data are to be temporarily stored, and when a size of the first write data is less than or equal to a capacity of the first buffer group, the first write data may be temporarily stored using only the first buffer group. Further, after the first write data are assigned to the first buffer group, when third write data corresponding to the first stream are to be temporarily stored, and when a size of the third write data is less than or equal to a storable capacity of the first buffer group, the third write data may be temporarily stored using only the first buffer group.

When the size of write data to be temporarily stored is greater than the capacity of the current buffer group (operation S241: YES), write data may be temporarily stored using the current buffer group and additionally using a new buffer group (operation S245). For example, when the second write data are to be temporarily stored, and when a size of the second write data is greater than a capacity of the second buffer group, some or a part of the second write data may be temporarily stored using the second buffer group, and the other or remainder of the second write data may be temporarily stored using a third buffer group which is a new buffer group.

Although an example of FIG. 4 and an example of FIG. 5 are separately illustrated, example embodiments are not limited thereto. In some example embodiments, a buffer group may be assigned by simultaneously or concurrently performing the operation of determining whether the buffer group already assigned for each stream exists in FIG. 4 and the operation of comparing the size of write data with the capacity of selected buffer group in FIG. 5. In other example embodiments, a buffer group may be assigned based on at least one of various conditions.

Figure 6:
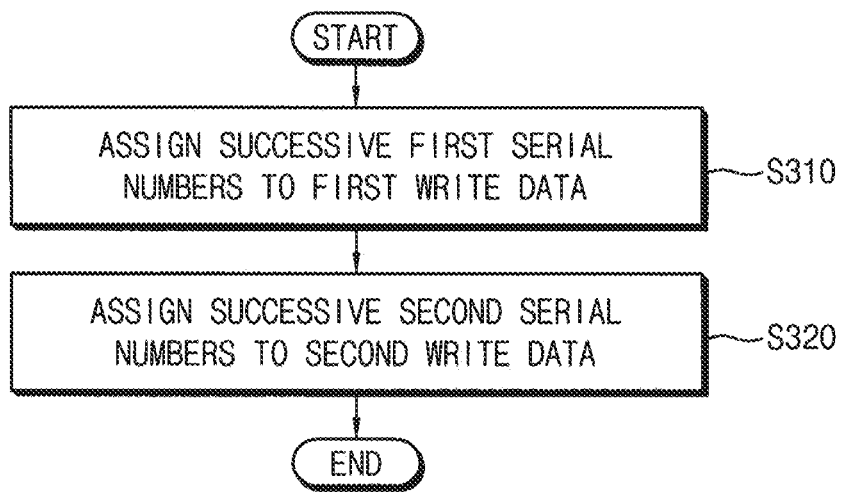
FIG. 6 is a flowchart illustrating an example of assigning a plurality of serial numbers to a plurality of write data in FIG. 1.

FIG. 6 is a flowchart illustrating an example of assigning a plurality of serial numbers to a plurality of write data in FIG. 1.

Referring to FIGS. 1 and 6, when assigning the plurality of serial numbers to the plurality of write data (operation S300), first serial numbers which are successive numbers may be assigned to the first write data (operation S310). The first write data may correspond to the first write command and the first stream, may have the first logical addresses which are successive addresses, and may be assigned to and temporarily stored in the first buffer group. Second serial numbers which are successive numbers may be assigned to the second write data (operation S320). The second write data may correspond to the second write command and the second stream, may have the second logical addresses which are successive addresses, and may be assigned to and temporarily stored in the second buffer group.

In some example embodiments, the first serial numbers may sequentially increase in accordance with an order of the first write data, and the second serial numbers may sequentially increase in accordance with an order of the second write data. Further, the largest serial number among the first serial numbers and the smallest serial number among the second serial numbers may be consecutive when the first write command and the second write command are consecutive. As described above, the first serial numbers and the second serial numbers may indicate the data write order provided from the host.

Figure 7:
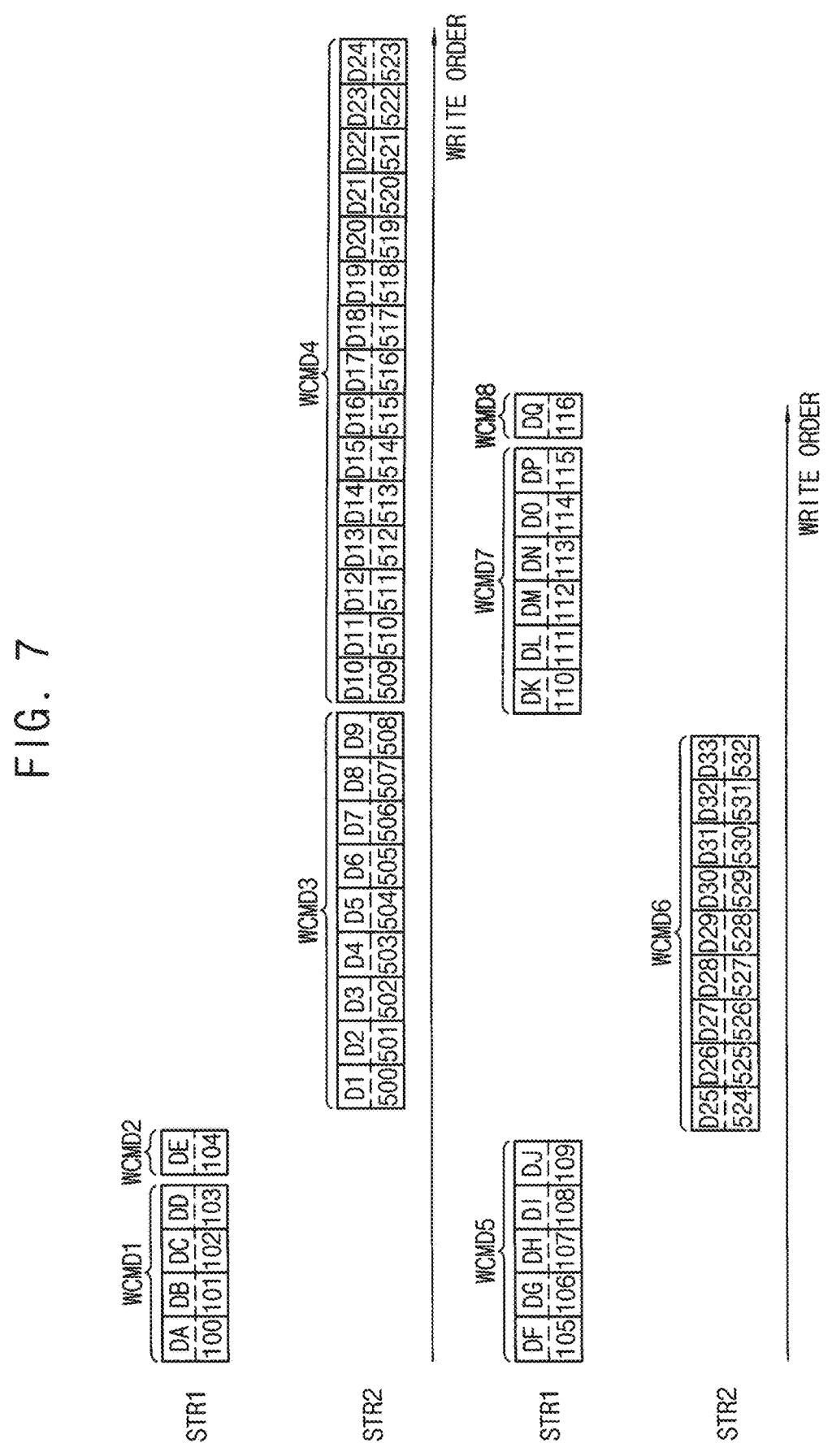

FIGS. 7, 8A, 8B, 8C, 8D, 8E, 8F, 8G and 8H are diagrams for describing a method of writing data in a storage device according to an example embodiment. FIG. 7 illustrates a plurality of data write commands and a plurality of write data that are sequentially received and a plurality of logical addresses corresponding to the plurality of write data. FIGS. 8A through 8H illustrate an example where the plurality of write data in FIG. 7 are sequentially assigned to buffer groups and a plurality of serial numbers are assigned to the plurality of write data in FIG. 7.

Referring to FIG. 7, data write commands WCMD1, WCMD2, WCMD3, WCMD4, WCMD5, WCMD6, WCMD7 and WCMD8 may be sequentially received, and then write data DA, DB, DC, DD, DE, D1, D2, D3, D4, D5, D6, D7, D8, D9, D10, D11, D12, D13, D14, D15, D16, D17, D18, D19, D20, D21, D22, D23, D24, DF, DG, DH, DI, DJ, D25, D26, D27, D28, D29, D30, D31, D32, D33, DK, DL, DM, DN, DO, DP and DQ may be sequentially received.

The write data DA, DB, DC, DD, DE, DF, DG, DH, DI, DJ, DK, DL, DM, DN, DO, DP and DQ corresponding to the data write commands WCMD1, WCMD2, WCMD5, WCMD7 and WCMD8 may correspond to a first stream STR1, and thus may have successive logical addresses 100, 101, 102, 103, 104, 105, 106, 107, 108, 109, 110, 111, 112, 113, 114, 115, and 116, respectively. Similarly, the write data D1, D2, D3, D4, D5, D6, D7, D8, D9, D10, D11, D12, D13, D14, D15, D16, D17, D18, D19, D20, D21, D22, D23, D24, D25, D26, D27, D28, D29, D30, D31, D32 and D33 corresponding to the data write commands WCMD3, WCMD4 and WCMD6 may correspond to a second stream STR2, and thus may have successive logical addresses 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531 and 532, respectively. The logical addresses 100 to 116 of the write data DA to DQ with the first stream STR1 and the logical addresses 500 to 532 of the write data D1 to D33 with the second stream STR2 may be non-consecutive.

The buffer assigning operation and the serial number assigning operation according to some example embodiments may be performed to ensure or guarantee a reception order of the data write commands WCMD1 to WCMD8 and the write data DA to DQ and D1 to D33 (e.g., the data write order from the host).

For example, referring to FIG. 8A, the write data DA, DB, DC and DD corresponding to the data write command WCMD1 received first may be sequentially assigned to and temporarily stored in a buffer group BG1. Serial numbers 1, 2, 3 and 4 that sequentially increase may be assigned to the write data DA, DB, DC and DD, respectively, in accordance with an assigning order of the write data DA to DD. As described with reference to FIGS. 3 through 5, since there is no buffer group already assigned for the first stream STR1 and a size of the write data DA to DD is less than a capacity of the buffer group BG1, the write data DA to DD may be assigned using only the buffer group BG1.

Referring to FIG. 8B, the write data DE corresponding to the data write command WCMD2 received subsequent to or after the data write command WCMD1 may be assigned to and temporarily stored in the buffer group BG1. A serial number 5 may be assigned to the write data DE in accordance with an assigning order of the write data DE. Since the buffer group BG1 already assigned for the first stream STR1 exists and a size of the write data DE is less than a storable capacity of the buffer group BG1, the write data DE may be assigned using only the buffer group BG1. Since the data write commands WCMD1 and WCMD2 are consecutive, the largest serial number 4 among the serial numbers 1 to 4 of the write data DA to DD and the serial number 5 of the write data DE may be consecutive.

Referring to FIG. 8C, the write data D1, D2, D3, D4, D5, D6, D7, D8 and D9 corresponding to the data write command WCMD3 received subsequent to or after the data write command WCMD2 may be sequentially assigned to and temporarily stored in buffer groups BG2 and BG3. Serial numbers 6, 7, 8, 9, 10, 11, 12, 13 and 14 that sequentially increase may be assigned to the write data D1, D2, D3, D4, D5, D6, D7, D8 and D9, respectively, in accordance with an assigning order of the write data D1 to D9. Since there is no buffer group already assigned for the second stream STR2 and a size of the write data D1 to D9 is greater than a capacity of the buffer group BG2, the write data D1 to D9 may be assigned using the buffer groups BG2 and BG3. Since the data write commands WCMD2 and WCMD3 are consecutive, the serial number 5 of the write data DE and the smallest serial number 6 among the serial numbers 6 to 14 of the write data D1 to D9 may be consecutive.

Referring to FIG. 8D, the write data D10, D11, D12, D13, D14, D15, D16, D17, D18, D19, D20, D21, D22, D23 and D24 corresponding to the data write command WCMD4 received subsequent to or after the data write command WCMD3 may be sequentially assigned to and temporarily stored in the buffer group BG3 and a buffer group BG4. Serial numbers 15, 16, 17, 18, 19, 20, 21, 22, 23, 24, 25, 26, 27, 28 and 29 that sequentially increase may be assigned to the write data D10, D11, D12, D13, D14, D15, D16, D17, D18, D19, D20, D21, D22, D23 and D24, respectively, in accordance with an assigning order of the write data D10 to D24. Since the buffer group BG3 already assigned for the second stream STR2 exists and a size of the write data D10 to D24 is greater than a storable capacity of the buffer group BG3, the write data D10 to D24 may be assigned using the buffer groups BG3 and BG4. Since the data write commands WCMD3 and WCMD4 are consecutive, the largest serial number 14 among the serial numbers 6 to 14 of the write data D1 to D9 and the smallest serial number 15 among the serial numbers 15 to 29 of the write data D10 to D24 may be consecutive.

Referring to FIG. 8E, by a similar manner to that described above, the write data DF, DG, DH, DI and DJ corresponding to the data write command WCMD5 received subsequent to or after the data write command WCMD4 may be sequentially assigned to and temporarily stored in the buffer group BG1 and a buffer group BG5. Serial numbers 30, 31, 32, 33 and 34 that sequentially increase may be assigned to the write data DF, DG, DH, DI and DJ, respectively, in accordance with an assigning order of the write data DF to DJ.

Referring to FIG. 8F, by a similar manner to that described above, the write data D25, D26, D27, D28, D29, D30, D31, D32 and D33 corresponding to the data write command WCMD6 received subsequent to or after the data write command WCMD5 may be sequentially assigned to and temporarily stored in buffer groups BG6 and BG7. Serial numbers 35, 36, 37, 38, 39, 40, 41, 42 and 43 that sequentially increase may be assigned to the write data D25, D26, D27, D28, D29, D30, D31, D32 and D33, respectively, in accordance with an assigning order of the write data D25 to D33.

Referring to FIG. 8G, by a similar manner to that described above, the write data DK, DL, DM, DN, DO and DP corresponding to the data write command WCMD7 received subsequent to or after the data write command WCMD6 may be sequentially assigned to and temporarily stored in the buffer group BG5. Serial numbers 44, 45, 46, 47, 48 and 49 that sequentially increase may be assigned to the write data DK, DL, DM, DN, DO and DP, respectively, in accordance with an assigning order of the write data DK to DP.

Referring to FIG. 8H, by a similar manner to that described above, the write data DQ corresponding to the data write command WCMD8 received subsequent to or after the data write command WCMD7 may be sequentially assigned to and temporarily stored in a buffer group BG8. A serial number 50 may be assigned to the write data DQ in accordance with an assigning order of the write data DQ.

Although an example where the serial numbers sequentially increase is described with reference to FIGS. 8A through 8H, example embodiments are not limited thereto. For example, serial numbers may be set to sequentially decrease.

Figure 9:
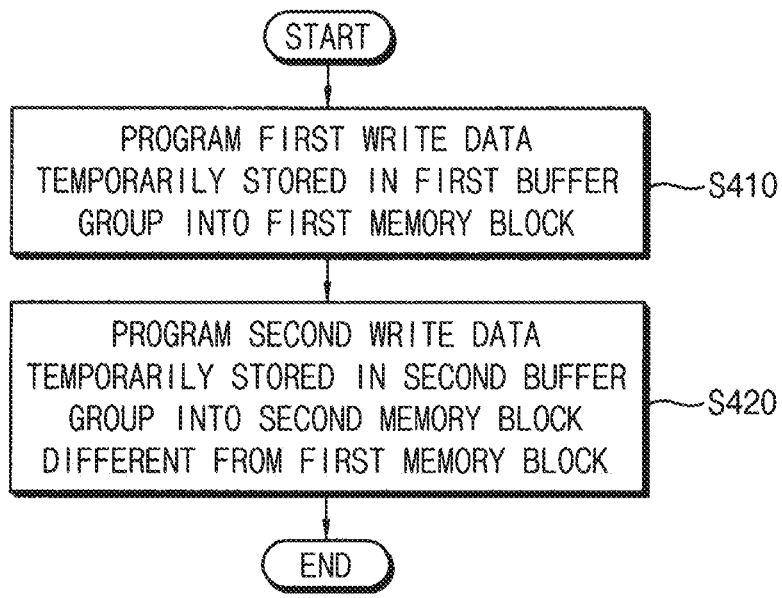
FIG. 9 is a flowchart illustrating an example of programming a plurality of write data into a plurality of memory blocks in FIG. 1.
Figure 10:
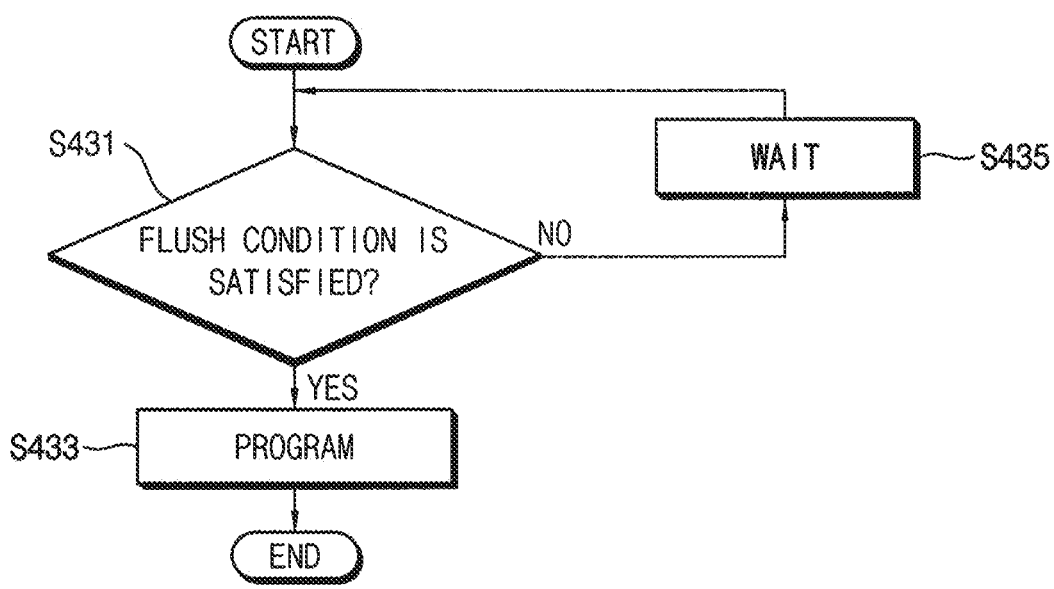
FIG. 10 is a flowchart illustrating a detailed example of a program operation of FIG. 9.

FIG. 9 is a flowchart illustrating an example of programming a plurality of write data into a plurality of memory blocks in FIG. 1. FIG. 10 is a flowchart illustrating a detailed example of a program operation of FIG. 9.

Referring to FIGS. 1 and 9, when programming the plurality of write data into the plurality of memory blocks (operation S400), the first write data that are temporarily stored in the first buffer group and correspond to the first stream may be programmed into a first memory block (operation S410). The second write data that are temporarily stored in the second buffer group and correspond to the second stream may be programmed into a second memory block (operation S420). The second memory block may be different from the first memory block. In other words, data with different streams may be stored in different memory blocks based on the multi-stream scheme. Further, when the first write data are programmed, the first serial numbers assigned to the first write data may be stored together. When the second write data are programmed, the second serial numbers assigned to the second write data may be stored together.

Referring to FIGS. 1, 9 and 10, when programming the first write data into the first memory block (operation S410), or when programming the second write data into the second memory block (operation S420), it may be determined or judged whether each buffer group temporarily stored in each write data satisfies a flush condition (operation S431).

When the flush condition is satisfied (operation S431: YES), a program operation may be performed (operation S433). For example, the flush condition may include whether a full (e.g., an entirely filled) buffer group exists, the number of full buffer groups, or the like. When the flush condition is not satisfied (operation S431: NO), a process or operation may wait until the flush condition is satisfied (operation S435).

FIG. 11 is a diagram for describing a method of writing data in a storage device according to an example embodiment. FIG. 11 illustrates an example of the program operation.

Referring to FIG. 11, a program operation for data temporarily stored in a buffer group which is full first among the buffer groups BG1, BG2, BG3, BG4, BG5 and BG6 may be performed first. As described with reference to FIGS. 8A through 8H, the buffer groups may be filled in an order of BG2, BG3, BG4, BG1, BG6 and BG5, and thus the write data DA to DP and D1 to D32 temporarily stored in the buffer groups BG1, BG2, BG3, BG4, BG5 and BG6 may be sequentially programmed in accordance with the above described order (e.g., in the order of BG2, BG3, BG4, BG1, BG6 and BG5). The write data DA to DP with the first stream STR1 and the write data D1 to D32 with the second stream STR2 may be programmed in different memory blocks. The buffer groups BG7 and BG8 may not be programmed until they are full.

In some example embodiments, if one buffer group corresponds to a unit of the program operation, one buffer group BG2 may become full and then may be immediately programmed, another buffer group BG3 may become full and then may be immediately programmed, and another buffer group BG4 may become full and then may be immediately programmed. In other example embodiments, if two buffer groups correspond to a unit of the program operation, the buffer group BG2 may become full, the buffer group BG3 may become full, and then two buffer groups BG2 and BG3 may be programmed together. After then, the buffer group BG4 may become full, the buffer group BG1 may become full, and then two buffer groups BG4 and BG1 may be programmed together.

Figure 12:
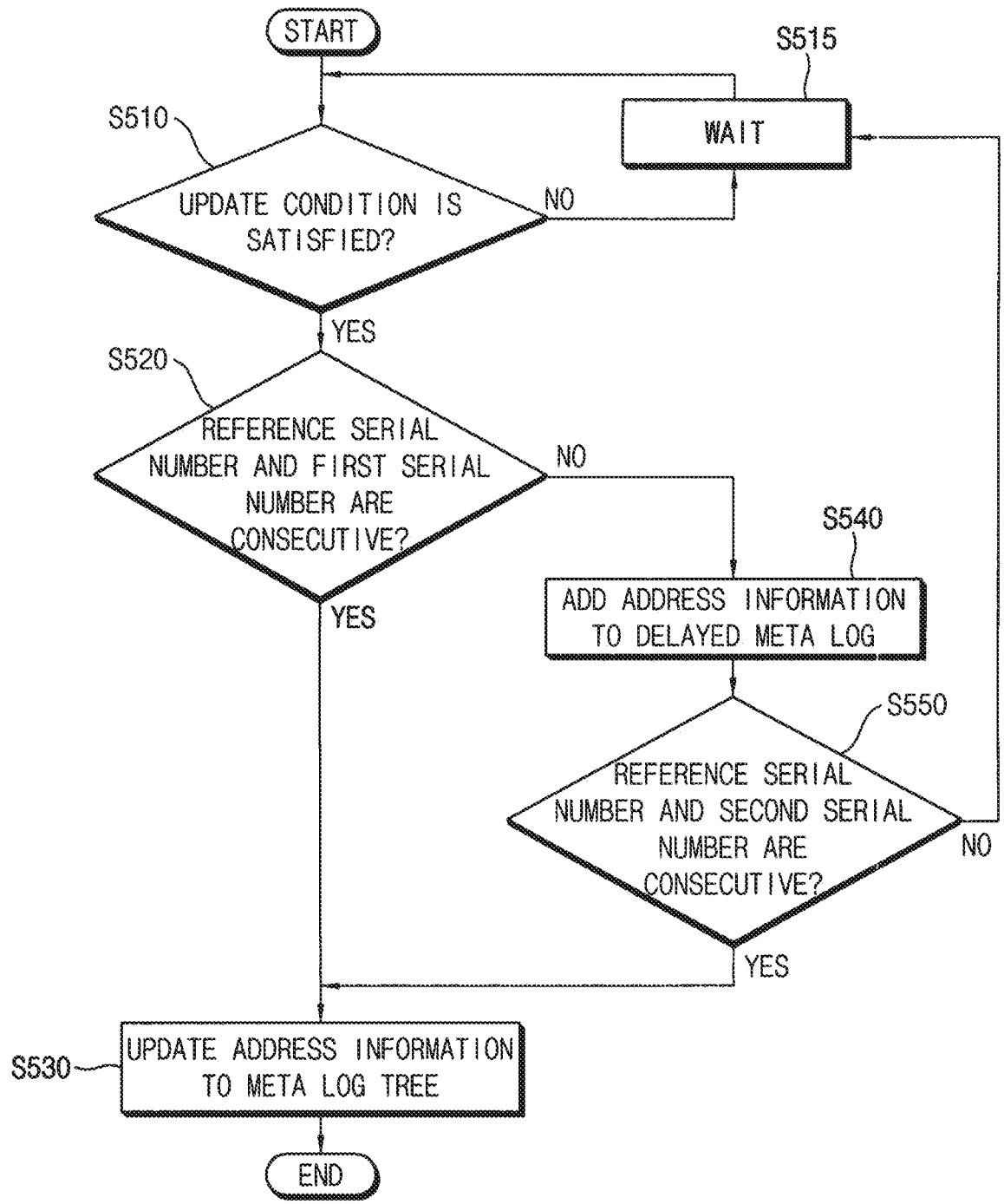
FIG. 12 is a flowchart illustrating an example of updating a logical-to-physical mapping table in FIG. 1.

FIG. 12 is a flowchart illustrating an example of updating a logical-to-physical mapping table in FIG. 1.

Referring to FIGS. 1 and 12, when updating the logical-to-physical mapping table (operation S500), it may be determined or judged first whether an update condition is satisfied (operation S510). For example, the update condition may include whether the program operation is performed, the number of programmed write data, the number of serial numbers included in a meta log tree and/or a delay meta log, or the like.

When the update condition is satisfied (operation S510: YES), a first serial number of first write data programmed in the memory block may be compared with a reference serial number (operation S520). The first serial number may be the smallest serial number among serial numbers of write data programmed in the memory block. The reference serial number may be a serial number of write data of which address information is normally updated and the address information is updated most recently. The reference serial number may be referred to as a safe serial number.

When the reference serial number and the first serial number are consecutive (operation S520: YES), address information of the first write data may be updated to or in a meta log tree (operation S530). Further, the reference serial number may be updated after the address information of the first write data is updated.

When the reference serial number and the first serial number are non-consecutive (operation S520: NO), the address information of the first write data may be added to or in a delayed meta log (operation S540).

After the address information of the first write data is added to the delayed meta log, a second serial number of second write data programmed in the memory block and included in the delayed meta log may be compared with the reference serial number (operation S550). The second serial number may be the smallest serial number among serial numbers of write data programmed in the memory block and included in the delay meta log.

When the reference serial number and the second serial number are consecutive (operation S550: YES), address information of the second write data may be updated to or in the meta log tree (operation S530).

When the reference serial number and the second serial number are non-consecutive (operation S550: NO), a process or operation may wait until the update condition is satisfied (operation S515).

Further, when the update condition is not satisfied (operation S510: NO), the process or operation may wait until the update condition is satisfied (operation S515).

In some example embodiments, although not illustrated FIG. 12, it may be difficult to wait indefinitely until the update condition is satisfied (e.g., due to the limitation of storage space of the delay meta log) when the reference serial number and the second serial number are non-consecutive (operation S550: NO), and thus the update operation may be performed using an appropriate algorithm in various manners.

Figure 13A:
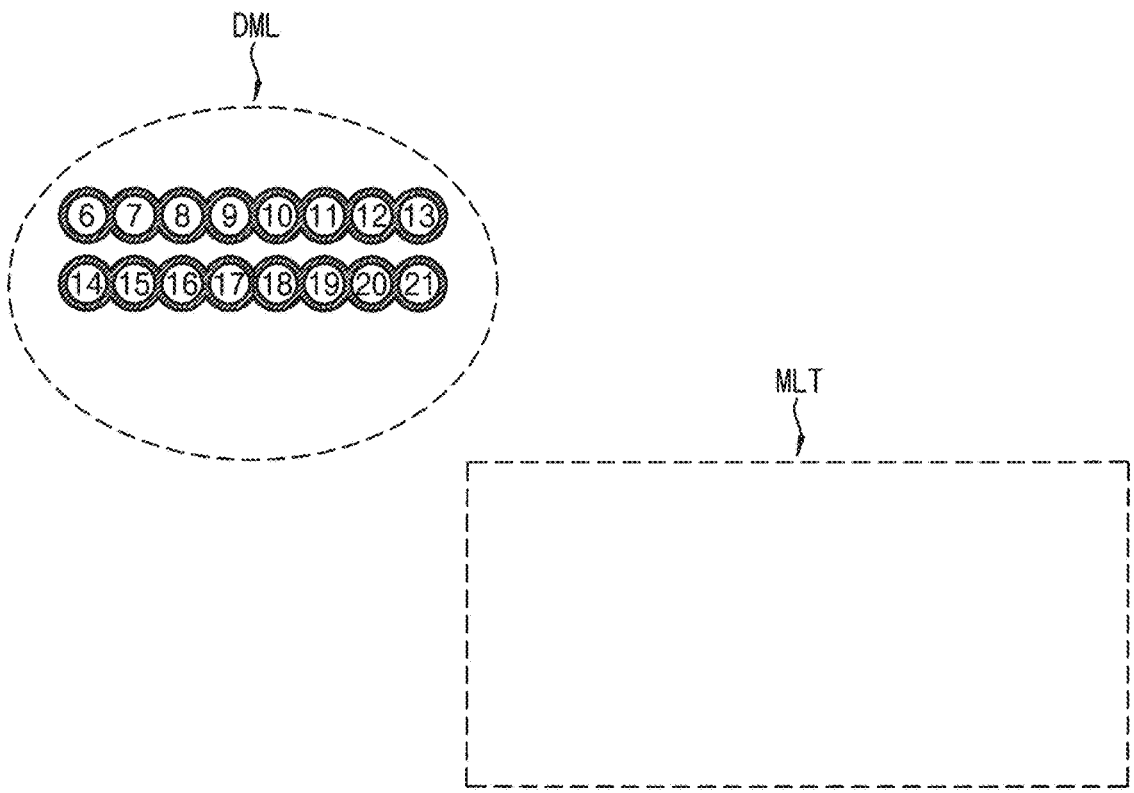
FIGS. 13A, 13B and 13C are diagrams for describing a method of writing data in a storage device according to an example embodiment.
Figure 13B:
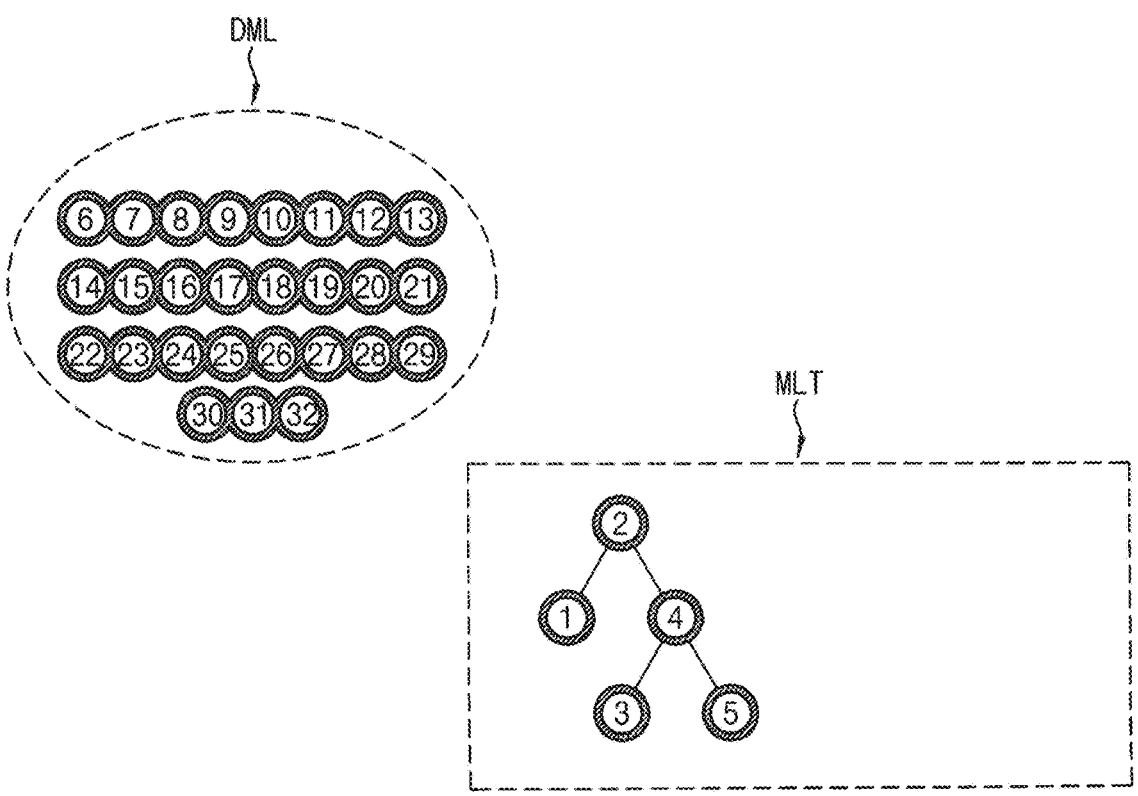
Figure 13C:
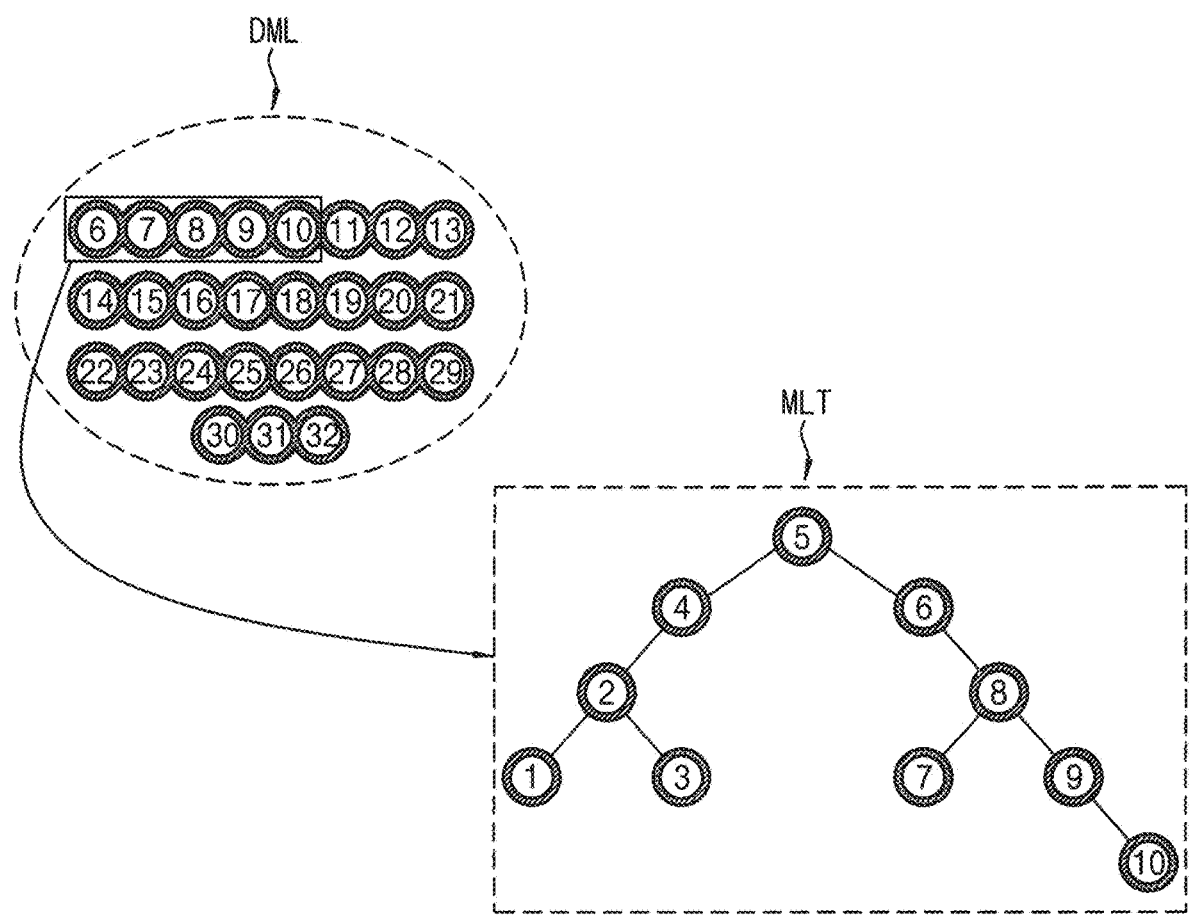

FIGS. 13A, 13B and 13C are diagrams for describing a method of writing data in a storage device according to an example embodiment. FIGS. 13A, 13B and 13C illustrate an example of the update operation.

Referring to FIG. 13A, an update operation is illustrated based on an example where the buffer groups are filled in the order of BG2, BG3, BG4, BG1, BG6 and BG5 and two buffer groups correspond to a unit of the program operation, as described with reference to FIGS. 8A through 8H and 11.

In an initial operation time, the update operation may not be performed at all (e.g., a meta log tree (MLT) may be empty), and thus the reference serial number may be set to zero.

When two buffer groups BG2 and BG3 become full and are programmed together, the smallest serial number 6 among the serial numbers 6 to 21 of the programmed write data D1 to D16 may be compared with the reference serial number (e.g., 0). The two serial numbers may be non-consecutive, and thus address information of the write data D1 to D16 may not be updated to the meta log tree MLT and may be added to a delay meta log DML. The smallest serial number 6 among the serial numbers 6 to 21 of the write data D1 to D16 included in the delay meta log DML and the reference serial number may also be non-consecutive, and thus the address information of the write data D1 to D16 may not be updated to the meta log tree MILT.

Although only serial numbers are illustrated in FIG. 13A and the following figures for convenience of illustration, information included in the delay meta log DML and the meta log tree MLT may include serial numbers, corresponding logical addresses (e.g., addresses provided from and recognized by the host) and corresponding physical addresses (e.g., addresses where data are actually stored in the storage device).

Referring to FIG. 13B, after two buffer groups BG2 and BG3 become full and are programmed together, other two buffer groups BG4 and BG1 may become full and may be programmed together. The smallest serial number 1 among the serial numbers 22 to 32 and 1 to 5 of the programmed write data D17 to D24 and DA to DH and the reference serial number may be consecutive, and thus address information of the write data DA to DE corresponding to the smallest serial number 1 and consecutive serial numbers 2 to 5 may be updated to the meta log tree MLT. After the address information of the write data DA to DE are successfully updated to the meta log tree MLT, the reference serial number may be updated to five corresponding to the serial number 5 that is normally and most recently updated.

In some example embodiments, the meta log tree MLT may be implemented in a form of a red-black (RB) tree. The RB tree may be a self-balancing binary search tree. In the RB tree, each node may not be shifted to one side, both sides may be rebalanced when there is an input value, and a number on the right side may be greater than a number on the left side.

The smallest serial number 22 among the serial numbers 22 to 32 of the remaining write data D17 to D24 and DF to DH and the updated reference serial number (e.g., 5) may be non-consecutive, and thus address information of the write data D17 to D24 and DF to DH may not be updated to the meta log tree MLT and may be added to the delay meta log DML.

Referring to FIG. 13C, the smallest serial number 6 among the serial numbers 6 to 32 of the write data D1 to D24 and DF to DH included in the delay meta log DML and the updated reference serial number may be consecutive, and thus address information of the write data D1 to D5 corresponding to the smallest serial number 6 and consecutive serial numbers 7 to 10 may be updated to the meta log tree MLT.

In some example embodiments, the meta log tree MLT may be implemented in the form of the RB tree as described above, and thus both sides may be rebalanced as the serial numbers 6 to 10 are additionally input.

Although FIG. 13C illustrates an example where only the address information of the write data D1 to D5 corresponding to the five serial numbers 6 to 10 are updated to or in the meta log tree MLT, the number of address information updated at one time may be changed according to some example embodiments. Further, although not illustrated in FIG. 13C, address information of the write data corresponding to consecutive serial numbers after the serial number 10 may also be sequentially updated to the meta log tree MLT.

As described with reference to FIGS. 9 through 11, the buffer groups BG1 to BG6 may be flushed in a full order, and thus a program order in the storage device may be different from the data write order from the host. However, as described with reference to FIGS. 12 and 13A through 13C, the update operation may be performed in consideration of the serial numbers indicating the data write order when the address information are reflected in the logical-to-physical mapping table, and thus the data write order from the host may be ensured without receiving the flush command and/or the barrier command for ensuring the data write order from the host.

In the method of writing data in the storage device according to an example embodiment, the serial number may be assigned in an order of the buffer assigning operation at the time of the buffer assigning operation, and the data write order from the host may be checked or verified after the program operation. For example, the multi-stream buffer operating scheme may be implemented by internally determining the continuity of the logical addresses in the storage device by itself without receiving the stream ID from the host, and the mapping table may be updated in consideration of the data write order (e.g., considering the serial numbers indicating the data write order) to ensure the data write order from the host.

When the storage device operates or is driven based on methods according to some example embodiments, no barrier option of the file system may be supported, the number of flushing may be reduced, and thus the storage device may have improved or enhanced performance.

Figure 14:
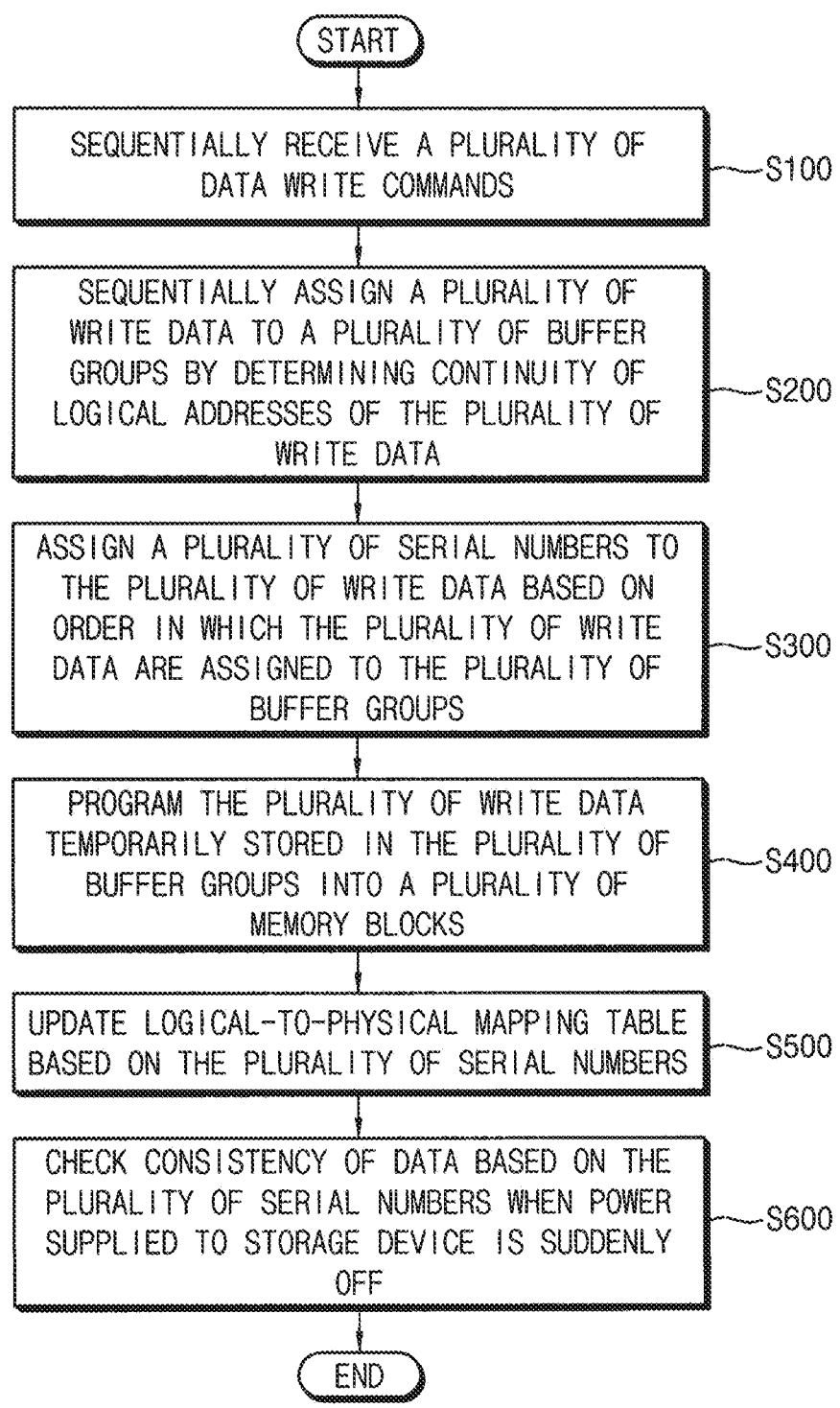
FIG. 14 is a flowchart illustrating a method of writing data in a storage device according to an example embodiment.

FIG. 14 is a flowchart illustrating a method of writing data in a storage device according to an example embodiment. The descriptions repeated with FIG. 1 will be omitted.

Referring to FIG. 14, in a method of writing data in a storage device according to an example embodiment, operations S100, S200, S300, S400 and S500 in FIG. 14 may be substantially the same as operations S100, S200, S300, S400 and S500 in FIG. 1, respectively.

A consistency of data may be checked based on the plurality of serial numbers when a power supplied to the storage device is suddenly off (e.g., in a sudden power-off case) (operation S600). In other words, even if the power supplied to the storage device is suddenly off, the data write order from the host may be ensured or guaranteed by performing a scan operation using the serial numbers stored together with the write data.

FIG. 15 is a diagram for describing a method of writing data in a storage device according to an example embodiment. FIG. 15 illustrate an example when the power supplied to the storage device is suddenly off.

Referring to FIG. 15, a sudden power-off case is illustrated based on an example where data and information up to the serial number 32 are updated and the serial number 32 is set to the reference serial number, as described with reference to FIGS. 13A through 13C.

When the power supplied to the storage device is suddenly off between the serial number 37 and the serial number 38 (e.g., ① in FIG. 15), the serial numbers 33 and 34 may not be updated, and the serial numbers 35, 36 and 37 may also not be updated. Thus, the consistency of the data may be maintained by discarding data and information associated with the serial numbers 35, 36 and 37.

When the power supplied to the storage device is suddenly off between the serial number 46 and the serial number 47 (e.g., ② in FIG. 15), it may be determined that data and information associated with the serial numbers 33 to 42 are successfully programmed and updated after the data and information up to the serial number 32 are updated. Thus, the consistency of the data may be maintained by discarding data and information associated with the serial numbers 44, 45 and 46.

Although examples are described above based on a certain number of commands, data, streams, serial numbers and buffer groups, and the meta log tree having a specific structure, example embodiments are not limited thereto. For example, at least one of the number of commands, data, streams, serial numbers and buffer groups, or a structure of the meta log tree may be changed according to some example embodiments.

As will be appreciated by those skilled in the art, the inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 16:
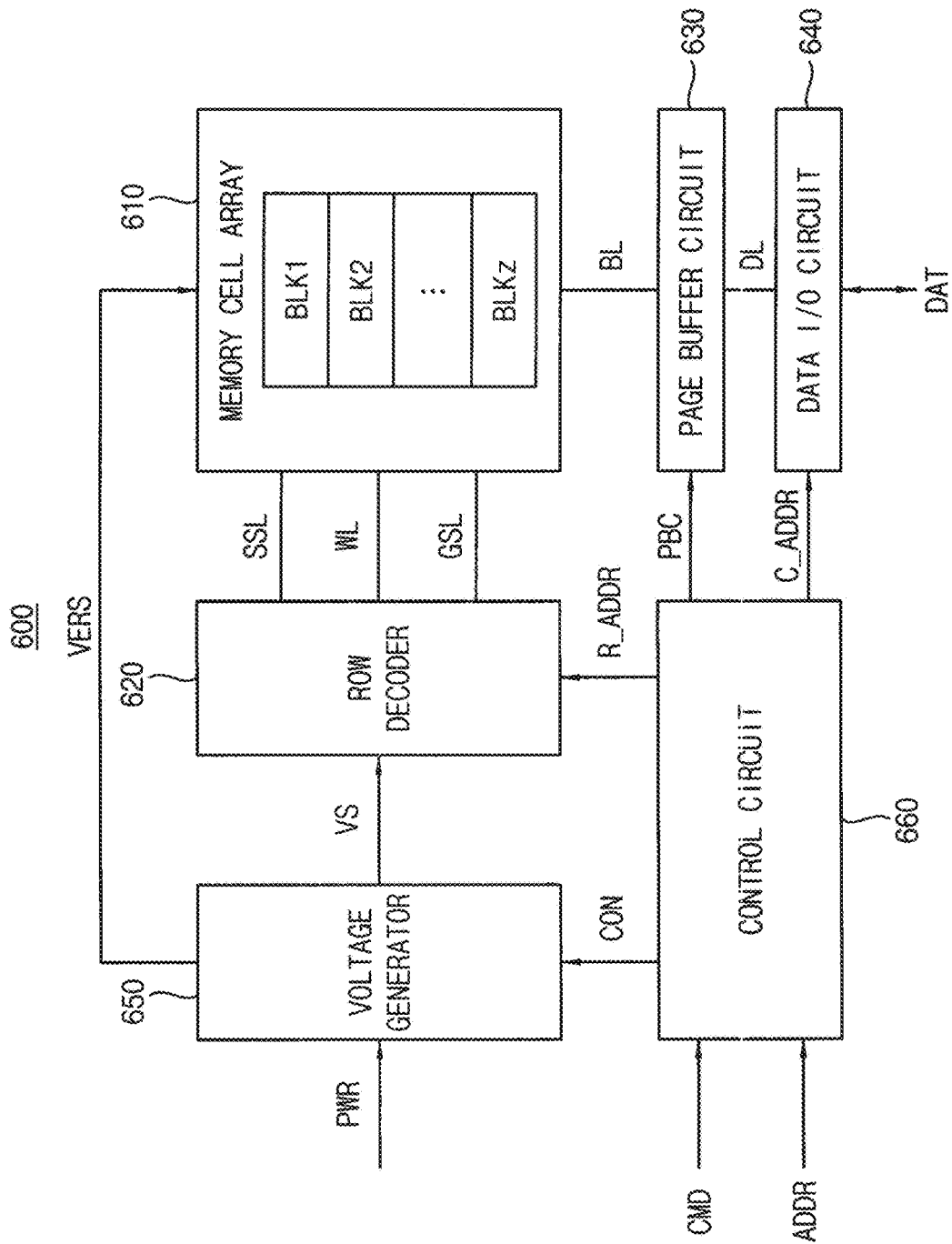
FIG. 16 is a block diagram illustrating an example of a nonvolatile memory included in a storage device according to an example embodiment.

FIG. 16 is a block diagram illustrating an example of a nonvolatile memory included in a storage device according to an example embodiment.

Referring to FIG. 16, a nonvolatile memory 600 includes a memory cell array 610, a row decoder 620, a page buffer circuit 630, a data input/output (I/O) circuit 640, a voltage generator 650 and a control circuit 660.

The memory cell array 610 is connected to the row decoder 620 via a plurality of string selection lines SSL, a plurality of wordlines WL and a plurality of ground selection lines GSL. The memory cell array 610 is further connected to the page buffer circuit 630 via a plurality of bitlines BL. The memory cell array 610 may include a plurality of memory cells (e.g., a plurality of nonvolatile memory cells) that are connected to the plurality of wordlines WL and the plurality of bitlines BL. The memory cell array 610 may be divided into a plurality of memory blocks BLK1, BLK2, . . . , BLKz each of which includes memory cells. In some example embodiments, the plurality of memory cells may be arranged in a two-dimensional (2D) array structure or a three-dimensional (3D) vertical array structure.

A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 660 receives a command CMD and an address ADDR from a memory controller (e.g., the host 200 and/or the storage controller 310 in FIG. 2), and control erasure, programming and read operations of the nonvolatile memory 600 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 660 may generate control signals CON, which are used for controlling the voltage generator 650, and may generate control signal PBC for controlling the page buffer circuit 630, based on the command CMD, and may generate a row address R_ADDR and a column address C_ADDR based on the address ADDR. The control circuit 660 may provide the row address R_ADDR to the row decoder 620 and may provide the column address C_ADDR to the data I/O circuit 640.

The row decoder 620 may be connected to the memory cell array 610 via the plurality of string selection lines SSL, the plurality of wordlines WL and the plurality of ground selection lines GSL.

The voltage generator 650 may generate voltages VS that are desired for an operation of the nonvolatile memory 600 based on a power PWR and the control signals CON. The voltages VS may be applied to the plurality of string selection lines SSL, the plurality of wordlines WL and the plurality of ground selection lines GSL via the row decoder 620. Further, the voltage generator 650 may generate an erase voltage VERS that is desired for the data erase operation based on the power PWR and the control signals CON. The erase voltage VERS may be applied to the memory cell array 610 directly or via the bitline BL The page buffer circuit 630 may be connected to the memory cell array 610 via the plurality of bitlines BL. The page buffer circuit 630 may include a plurality of page buffers. In some example embodiments, each page buffer may be connected to one bitline. In other example embodiments, each page buffer may be connected to two or more bitlines.

The page buffer circuit 630 may store data DAT to be programmed into the memory cell array 610 or may read data DAT sensed from the memory cell array 610. In other words, the page buffer circuit 630 may operate as a write driver or a sensing amplifier according to an operation mode of the nonvolatile memory 600.

The data I/O circuit 640 may be connected to the page buffer circuit 630 via data lines DL. The data I/O circuit 640 may provide the data DAT from an outside of the nonvolatile memory 600 to the memory cell array 610 via the page buffer circuit 630 or may provide the data DAT from the memory cell array 610 to the outside of the nonvolatile memory 600, based on the column address C_ADDR.

Figure 17:
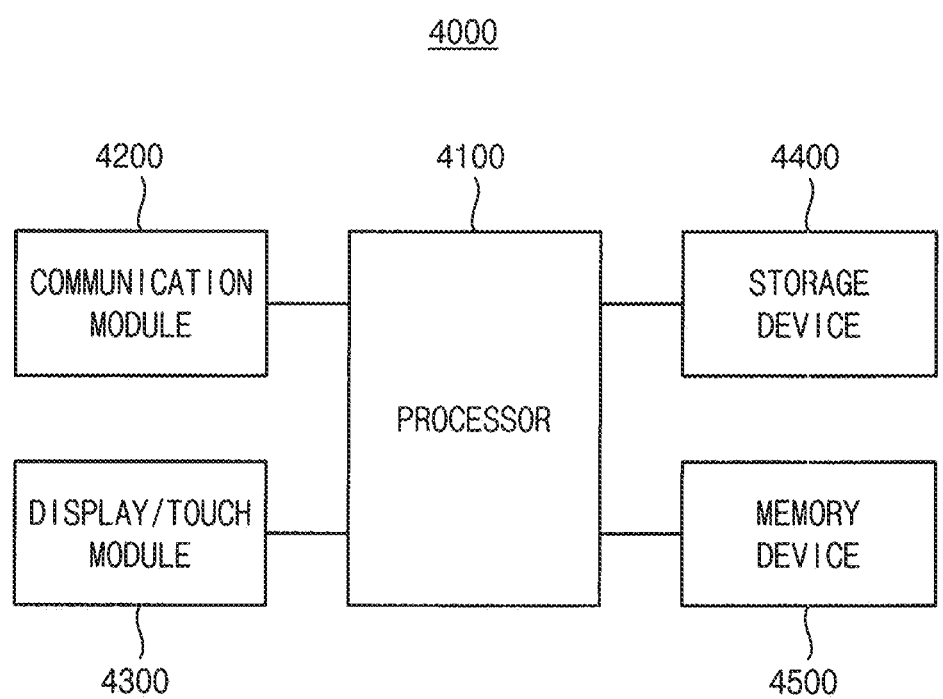
FIG. 17 is a block diagram illustrating an electronic system according to an example embodiment.

FIG. 17 is a block diagram illustrating an electronic system according to an example embodiment.

Referring to FIG. 17, an electronic system 4000 includes at least one processor 4100, a communication module 4200, a display/touch module 4300, a storage device 4400 and a memory device 4500. For example, the electronic system 4000 may be any mobile system or any computing system.

The processor 4100 controls operations of the electronic system 4000. The processor 4100 may execute an operating system and at least one application to provide an interne browser, games, videos, or the like. The communication module 4200 is implemented to perform wireless or wire communications with an external device. The display/touch module 4300 is implemented to display data processed by the processor 4100 and/or to receive data through a touch panel. The storage device 4400 is implemented to store user data, and is driven based on methods according to some example embodiments. The memory device 4500 temporarily stores data used for processing operations of the electronic system 4000. The processor 4100 and the storage device 4400 in FIG. 17 may correspond to the host 200 and the storage device 300 in FIG. 2, respectively.

The inventive concepts may be applied to various electronic devices and systems including the storage device and the storage system. For example, the inventive concepts may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, or a robotic device.

The storage controller, host processor, control circuit, processor described in this disclosure may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The foregoing is illustrative of example embodiments and is not to be construed as limiting thereof. Although some example embodiments have been described, those skilled in the art will readily appreciate that many modifications are possible in the disclosed example embodiments without materially departing from the novel teachings and advantages thereof. Accordingly, all such modifications are intended to be included within the scope of example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of writing data in a storage device, the method comprising:
   sequentially receiving a plurality of data write commands;
   sequentially assigning a plurality of write data corresponding to the plurality of data write commands to a plurality of buffer groups in a buffer memory by determining continuity of logical addresses of the plurality of write data such that each of the plurality of buffer groups temporarily stores some of the plurality of write data included in a respective single stream, the some of the plurality of write data having one set or more of consecutive logical addresses based on a size of the each of the plurality of buffer groups and a size of the plurality of write data corresponding to a respective one of the plurality of data write commands;
   assigning a plurality of serial numbers to the plurality of write data, respectively, based on an order in which the plurality of write data are assigned to the plurality of buffer groups regardless of which respective ones of the plurality of buffer groups corresponding to the plurality of write data;
   programming the plurality of write data temporarily stored in the plurality of buffer groups into a plurality of memory blocks; and
   updating a logical-to-physical mapping table based on the plurality of serial numbers,
   wherein the serial numbers are not the logical addresses, and
   wherein each of the plurality of data write commands is associated with one or more units of the plurality of write data, and each unit of the plurality of write data corresponds to a corresponding one of the plurality of serial numbers.

2. The method of claim 1, wherein the sequentially assigning a plurality of write data to the plurality of buffer groups includes:
   assigning first write data to a first buffer group, the first write data corresponding to a first write command and a first stream and having first logical addresses which are successive addresses; and
   assigning second write data to a second buffer group, the second write data corresponding to a second write command and a second stream and having second logical addresses which are successive addresses, the second write command being subsequent to the first write command, the second stream being different from the first stream.

3. The method of claim 2, wherein the sequentially assigning a plurality of write data to the plurality of buffer groups further includes:
   assigning third write data to the first buffer group in response to a size of the first write data being less than a capacity of the first buffer group, the third write data corresponding to a third write command and the first stream and having third logical addresses which are successive addresses, the third write command being subsequent to the first write command.

4. The method of claim 2, wherein the sequentially assigning a plurality of write data to the plurality of buffer groups further includes:
   assigning a part of the second write data to a third buffer group in response to a size of the second write data being greater than a capacity of the second buffer group.

5. The method of claim 2, wherein the assigning a plurality of serial numbers to the plurality of write data includes:
   assigning first serial numbers which are successive numbers to the first write data; and
   assigning second serial numbers which are successive numbers to the second write data.

6. The method of claim 5, wherein
   the first serial numbers sequentially increase in accordance with an order of the first write data, and
   the second serial numbers sequentially increase in accordance with an order of the second write data.

7. The method of claim 6, wherein a largest serial number among the first serial numbers associated with the first write command and a smallest serial number among the second serial numbers associated with the second write command that is consecutive to the first write command are consecutive.

8. The method of claim 5, wherein the programming includes:
programming the first write data temporarily stored in the first buffer group into a first one of the memory blocks; and
programming the second write data temporarily stored in the second buffer group into a second one of the plurality of memory blocks that is different from the first one of the memory blocks.

9. The method of claim 8, wherein the programming includes performing a program operation first for data temporarily stored in one of the buffer groups that is entirely filled first.

10. The method of claim 1, wherein the updating includes:
comparing a first serial number of first write data programmed in a first corresponding one of the memory blocks with a reference serial number; and
updating address information of the first write data to a meta log tree in response to the reference serial number and the first serial number being consecutive to each other.

11. The method of claim 10, wherein the updating further includes:
adding the address information of the first write data to a delayed meta log in response to the reference serial number and the first serial number being non-consecutive.

12. The method of claim 10, wherein the updating further includes:
comparing a second serial number of second write data programmed in a second corresponding one of the memory blocks and included in a delayed meta log with the reference serial number; and
updating address information of the second write data to the meta log tree in response to the reference serial number and the second serial number being consecutive.

13. The method of claim 12, wherein:
the first serial number is a smallest one among a first sub-set of the serial numbers assigned to the first write data, which is programmed in the first corresponding one of the memory blocks, and
the second serial number is a smallest one among a second sub-set of the serial numbers assigned to the second write data, which is programmed in the second corresponding one of the memory blocks and included in the delayed meta log.

14. The method of claim 1, wherein the plurality of serial numbers of the plurality of write data indicates a data write order provided from an external host.

15. The method of claim 1, further comprising:
checking a consistency of data based on the plurality of serial numbers in response to a sudden cut-off of a power supplied to the storage device.

16. A storage device comprising:
a plurality of nonvolatile memories including a plurality of memory blocks;
at least one buffer memory including a plurality of buffer groups; and
a storage controller configured to,
sequentially receive a plurality of data write commands,
sequentially assign a plurality of write data corresponding to the plurality of data write commands to the plurality of buffer groups in a buffer memory by determining continuity of logical addresses of the plurality of write data,
assign a plurality of serial numbers to the plurality of write data based on an order in which the plurality of write data are assigned to the plurality of buffer groups, regardless of which respective ones of the plurality of buffer groups corresponding to the plurality of write data, such that each of the plurality of buffer groups temporarily stores some of the plurality of write data included in a respective single stream and having consecutive logical addresses,
program the plurality of write data temporarily stored in the plurality of buffer groups into the plurality of memory blocks, and
update a logical-to-physical mapping table based on the plurality of serial numbers,
wherein the serial numbers are not the logical addresses, and
wherein each of the plurality of data write commands is associated with one or more units of the plurality of write data, and unit of the plurality of write data corresponds to a corresponding one of the plurality of serial numbers.

17. The storage device of claim 16, wherein the at least one buffer memory includes at least one volatile memory.

18. The storage device of claim 16, wherein the storage device includes at least one of an embedded multi-media card (eMMC) or a universal flash storage (UFS).

19. A storage system comprising:
a host configured to sequentially provide a plurality of data write commands and a plurality of write data corresponding to the plurality of data write commands; and
a storage device controlled by the host and configured to store the plurality of write data, the storage device including,
a plurality of nonvolatile memories including a plurality of memory blocks,
at least one buffer memory including a plurality of buffer groups, and
a storage controller configured to,
sequentially receive the plurality of data write commands,
sequentially assign the plurality of write data to the plurality of buffer groups included in a buffer memory by determining continuity of logical addresses of the plurality of write data such that each of the plurality of buffer groups temporarily stores some of the plurality of write data included in a respective single stream, the some of the plurality of write data having one set or more of consecutive logical addresses based on a size of the each of the plurality of buffer groups and a size of the plurality of write data corresponding to a respective one of the plurality of data write commands,
assign a plurality of serial numbers to the plurality of write data based on an order in which the plurality of write data are assigned to the plurality of buffer groups, regardless of which respective ones of the plurality of buffer groups corresponding to the plurality of write data, such that each of the plurality of buffer groups temporarily stores some of the plurality of write data included in a respective single stream and having consecutive logical addresses, program the plurality of write data temporarily stored in the plurality of buffer groups into the plurality of memory blocks, and update a logical-to-physical mapping table based on the plurality of serial numbers, wherein the serial numbers are not the logical addresses, and wherein each of the plurality of data write commands is associated with one or more units of the plurality of write data, and each unit of the plurality of write data corresponds to a corresponding one of the plurality of serial numbers.

20. The storage system of claim 19, wherein the storage system is one of a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an e-book reader, a virtual reality (VR) device, an augmented reality (AR) device, or a robotic device.

* * * * *